US011679724B2

(12) United States Patent
Dayani

(10) Patent No.: US 11,679,724 B2
(45) Date of Patent: Jun. 20, 2023

(54) COLLAPSIBLE AND ADAPTABLE CAR ROOF RACK

(71) Applicants: Aviad Avraham Dayani, Ashkelon (IL); Ofir Dvir Amidi, Ashkelon (IL)

(72) Inventor: Aviad Avraham Dayani, Ashkelon (IL)

(*) Notice: Subject to any disclaimer, the term of this patent is extended or adjusted under 35 U.S.C. 154(b) by 298 days.

(21) Appl. No.: 17/029,109

(22) Filed: Sep. 23, 2020

(65) Prior Publication Data
US 2021/0188183 A1 Jun. 24, 2021

Related U.S. Application Data

(60) Provisional application No. 62/950,127, filed on Dec. 19, 2019.

(51) Int. Cl.
*B60R 9/058* (2006.01)
*B60R 9/045* (2006.01)
*B60R 9/052* (2006.01)

(52) U.S. Cl.
CPC .............. *B60R 9/045* (2013.01); *B60R 9/052* (2013.01); *B60R 9/058* (2013.01)

(58) Field of Classification Search
CPC ......... B60R 9/058; B60R 9/045; B60R 9/052; B60R 9/04
See application file for complete search history.

(56) References Cited

U.S. PATENT DOCUMENTS

| 4,226,354 | A | * | 10/1980 | Allen | ........................ | B60R 9/04 |
| | | | | | | 224/318 |
| 4,586,638 | A | * | 5/1986 | Prescott | .................. | B60R 9/058 |
| | | | | | | 224/322 |
| 4,997,116 | A | * | 3/1991 | Grim | ........................ | B60R 9/06 |
| | | | | | | 224/532 |
| 5,104,020 | A | * | 4/1992 | Arvidsson | ............... | B60R 9/058 |
| | | | | | | 224/322 |
| 5,137,195 | A | * | 8/1992 | Walter | .................... | B60R 9/058 |
| | | | | | | 224/322 |
| 5,267,681 | A | * | 12/1993 | Walter | .................... | B60R 9/058 |
| | | | | | | 24/703.1 |
| 5,335,836 | A | * | 8/1994 | Waddell | .................. | B60R 9/058 |
| | | | | | | 224/322 |
| 5,388,738 | A | | 2/1995 | Russell | | |
| 5,390,837 | A | | 2/1995 | Ruffolo, Jr. | | |
| 5,823,412 | A | * | 10/1998 | Haug | ...................... | B60R 9/058 |
| | | | | | | 224/329 |

(Continued)

*Primary Examiner* — Brian D Nash

(57) ABSTRACT

The present invention, in some embodiments thereof, relates to mechanical device for securing objects to the roof of a vehicle, and more particularly, but not exclusively, to a collapsible car roof rack adaptable to multiple car shapes. An aspect of some embodiments of the current invention, referred to herein as the roof rack, relates to a roof rack deployed across the width of a car. Optionally the rack may include two units. For example, a proximal end of each unit may be mechanically attached between a car door and/or frame (i.e. sandwiched between the door and the frame). Alternatively or additionally, the distal end of the roof rack may be removably coupled to the car roof by a combination of magnetic coupling and/or friction. Optionally, each unit can fold small for easy transport and/or storage.

20 Claims, 20 Drawing Sheets

(56) References Cited

U.S. PATENT DOCUMENTS

| | | | | |
|---|---|---|---|---|
| 5,947,354 A | * | 9/1999 | Williams | B60R 9/04 |
| | | | | 224/314 |
| 6,863,249 B1 | | 3/2005 | Alvord | |
| 8,534,516 B1 | * | 9/2013 | Vo | G09F 21/042 |
| | | | | 224/329 |
| 2015/0182020 A1 | * | 7/2015 | Rahman | B60R 7/14 |
| | | | | 211/64 |
| 2016/0039352 A1 | * | 2/2016 | Buchman | B60R 9/058 |
| | | | | 224/329 |

* cited by examiner

COLLAPSIBLE AND ADAPTABLE CAR ROOF RACK

RELATED APPLICATION/S

This application claims the benefit of priority under 35 USC § 119(e) of U.S. Provisional Patent Application No. 62/950,127 filed 19 Dec. 2019, the contents of which are incorporated herein by reference in their entirety.

FIELD AND BACKGROUND OF THE INVENTION

The present invention, in some embodiments thereof, relates to mechanical device for securing objects to the roof of a vehicle, and more particularly, but not exclusively, to an collapsible car roof rack adaptable to multiple car shapes.

SUMMARY OF THE INVENTION

According to an aspect of some embodiments of the invention, there is provided a rack for mounting on a car roof including: a rack body configured for holding a load; a distal support located on a distal portion of the rack body configured to support the distal portion of the rack body above a roof of a car; an anchor rigidly attached to a proximal portion of the rack body, the anchor projecting downward from the rack body and thin enough to fit between a closed door and door frame of a car.

According to some embodiments of the invention, the rack folds to less than half its extended length.

3. The rack of alim 1a, including a single hinge to perform the folding.

According to some embodiments of the invention, the rack includes a first anchor support supporting the anchor extending laterally from a first side of the rack body and a second anchor support supporting a second anchor extending laterally on an opposite side and below the rack body.

According to some embodiments of the invention, the rack further includes an adjustable length arm connecting the anchor to the distal support.

According to some embodiments of the invention, the rack includes an adjustable length extension extending in a downward direction between the anchor and the rack body.

According to some embodiments of the invention, the rack further includes a proximal support.

According to some embodiments of the invention, the anchor support including an overlapping portion between the anchor and a proximal endpoint of the rack body.

According to some embodiments of the invention, an amount of the overlap between the rack body and the anchor is adjustable.

According to some embodiments of the invention, the anchor includes a malleable portion.

According to some embodiments of the invention, the malleable portion is insertable between the door frame and the closed door the malleable portion configured to deform to conform to a shape of an interface between the car door and the car door frame by forces exerted by the car door and the car door frame.

According to some embodiments of the invention, the rack further includes: a distal cross-piece connected at a distal portion of the rack body and a proximal cross-piece connected at a proximal portion of the rack body.

According to some embodiments of the invention, the anchor support includes two symmetrical extensions from the rack body, the symmetrical extensions extending in a downward and proximal direction.

According to some embodiments of the invention, the distal support includes a distal cross-piece extending laterally of opposite sides of the rack body.

According to some embodiments of the invention, the distal support includes a magnetic pad configured to rest on a roof of a car.

According to some embodiments of the invention, the rack further includes a lever extending below the rack body and distal to the distal support, the lever shaped and sized such that when the distal support is placed on a horizontal surface and the rack body is horizontal, the lever is held above the surface and when the distal support is placed on the horizontal surface and a proximal end of the rack body is slanted upwards, the lever contacts the surface According to some embodiments of the invention, the rack further includes a roller, the roller, the roller mounted on a transverse axle on a distal portion of the lever, the roller configured to roll in a longitudinal direction with respect to the rack body along the surface.

According to some embodiments of the invention, the adjustable length arm includes a ratchet mechanism allowing the anchor to be freely inserted towards the distal support and the ratchet mechanism inhibits extending away from the distal support unless a ratchet release mechanism is actuated.

According to some embodiments of the invention, the rack body includes an internal channel and the ratchet mechanism is located inside the internal channel.

According to some embodiments of the invention, the adjustable length arm allowing adjustment of a distance between the proximal cross-piece and the anchor.

According to some embodiments of the invention, the roof rack further includes wherein the rack body includes an exposed channel configured for mounting an accessory mount.

According to some embodiments of the invention, the roof rack further includes the accessory mount mountable onto the exposed channel, and including a mechanism to lock and unlock a location of the accessory mount along a length of the rack body.

According to some embodiments of the invention, the roof rack further includes at least one folding joint in the rack body.

According to an aspect of some embodiments of the invention, there is provided a method of attaching a roof rack to a car including: Locating a distal support of the roof rack on a car roof; Locating a proximal anchor of the rack between a frame the car and an open door of the car; Closing the door onto the anchor to immobilize the anchor with respect to the car.

According to some embodiments of the invention, the method further includes reducing a length between the rack anchors and the distal support, and fixing the reduced length by a rachet mechanism.

According to some embodiments of the invention, the method further includes adjusting a height of the anchors relative to the roof rack.

According to an aspect of some embodiments of the invention, there is provided a roof rack for mounting on a car roof including: at least one rack body; a distal cross-piece including downward facing pads connected at a distal end of each rack body; an anchor connected in an overlapping manner to a proximal end of each rack body, the anchor disposed in a downward facing direction, wherein an amount of the overlap between the rack body and the anchor is adjustable; and the anchor including a malleable vertical flange insertable onto a car door frame when a corresponding car door is open, wherein when the car door is closed onto the malleable vertical flange, the malleable vertical flange is deformed to conform to a shape of an interface between the closed car door and the car door frame by forces exerted by the closed car door and the car door frame.

According to some embodiments of the invention, the roof rack further includes a rack wall.

According to some embodiments of the invention, the roof rack further includes at least one folding joint in the rack body.

According to some embodiments of the invention, the distal cross-piece includes an extension connected at a central point to the rack body and rotatable around the central point, extending on a plane below and substantially parallel to the rack body, wherein the pads are connected to a downward facing surface of each of two endpoints of the extension.

According to some embodiments of the invention, the pads comprise a magnetic element.

According to an aspect of some embodiments of the invention, there is provided a roof rack including: two rack elements, each rack element including a rack body configured for holding a load; a distal support located on a distal portion of the rack body configured to support the distal portion of the rack body above a roof of a car; an anchor attached to a proximal portion of the rack body, the anchor projecting downward from the rack body and thin enough to fit between a closed door and door frame of a car.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings and images. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Overview

Figure 1A:
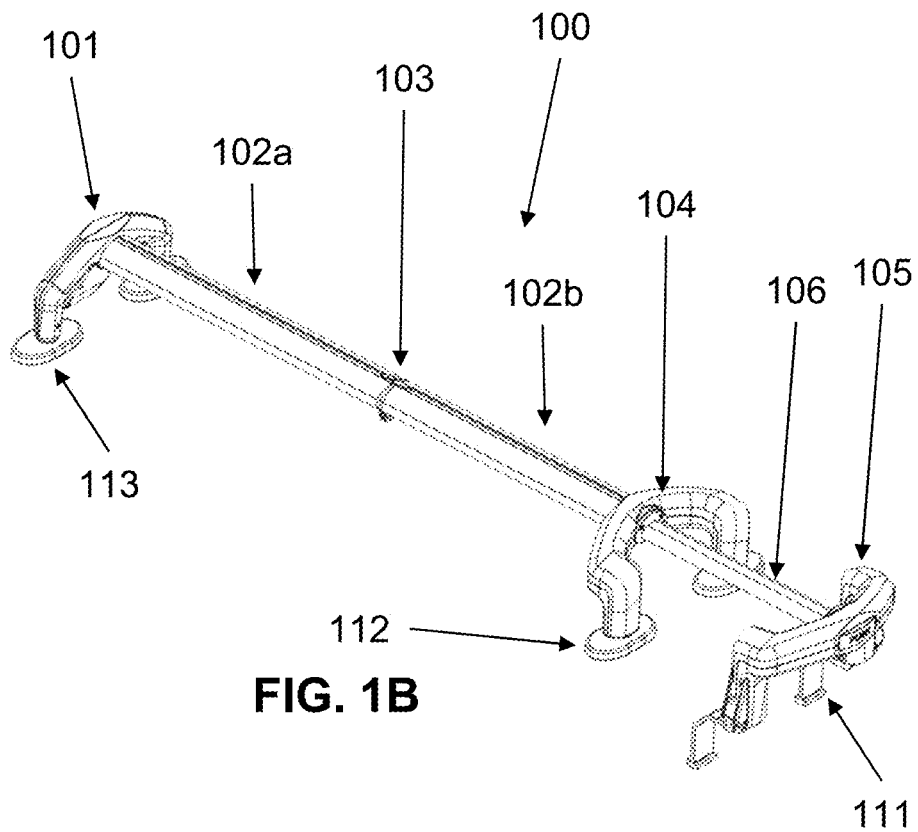
FIG. 1A is a schematic drawing of an open roof rack unit fully extended in accordance with an embodiment of the current invention.

The present invention, in some embodiments thereof, relates to mechanical device for securing objects to the roof of a vehicle, and more particularly, but not exclusively, to a collapsible car roof rack adaptable to multiple car shapes.

An aspect of some embodiments of the current invention, referred to herein as the roof rack, relates to a roof rack including one, two or more units deployed across the width of a car. Optionally, two or more units may be sold as a kit. A proximal end of the roof rack unit is mechanically attached to the car, for example to a door and/or frame (i.e. via an anchor sandwiched between the door and the frame). Optionally, the anchor is rigidly connected to the body of the rack. Optionally, the distal end of the roof rack unit may be removably coupled to the car roof by a combination of magnetic coupling and/or friction. Optionally the unit may include a proximal foot that rests of the roof of the car. The proximal foot is optionally non-magnetic. Alternatively or additionally, the proximal foot may include magnet. Alternatively or additionally, there may not be a proximal foot, for example the proximal side of the rack may rest on the anchors. Optionally, the rack unit does not require any straps to connect to the roof. Optionally the rack unit is adjustable for many sizes of car rooves (for example having a width ranging from 860 mm to 1091 mm) and/or of any length. Optionally the unit may fold to less than 600 mm. Optionally, the rack unit may fold to less than 600 mm length and/or between 600 and 700 mm and/or between 700 to 1000 mm. Optionally, the rack unit may fold to less than 270 mm width and/or between 270 and 400 mm and/or between 400 to 800 mm. Optionally, the rack unit may fold to less than 270 mm height and/or between 270 and 400 mm and/or between 400 to 1000 mm.

In some embodiments, the roof rack comprises a rack unit. In some embodiments the rack unit comprises an anchoring end-piece, referred to herein as the anchor; an anchor support; an elongated piece to mount across a width of a car roof referred to herein as the rack body; a stability cross-piece, referred to herein as the distal cross-piece or the proximal cross-piece; a rack wall; and/or a telescoping mechanism to connect the anchor support to a proximal end of the roof rack. Optionally, the telescoping mechanism includes a ratchet. The anchor support and/or the proximal cross-piece may be located at or near a proximal end of the roof rack. The distal cross-piece may be located at or near a distal end of the roof rack.

In some embodiments, the anchor may be malleably adaptable to mechanically attach to various shapes and contours of different car door frames.

In some embodiments, the roof rack may be mechanically attached to a car by locating the anchor and/or anchor support along the top of the frame of an open car door and/or closing the car door. Optionally, the force exerted on the anchor by the door and door frame mechanically couples the proximal end of the roof rack to the car. Detachment of the roof rack may be accomplished by opening the car door, allowing the roof rack to be removed from the car roof.

Optionally, the length of the roof rack may be shortened to hold the anchor in place when the car door is opened, thereby maintaining the coupling of the roof rack to the car when the car door is opened.

Optionally, detachment of the roof rack may be accomplished by opening the car door and lengthening the roof rack, allowing the roof rack to be removed from the car roof.

In some embodiments, the distal cross-piece that may be wider than other portions of the roof rack. The distal cross-piece may comprise, for example, a pad that may rest on the car roof when the roof rack is attached to a car. In a preferred embodiment, the distal cross-piece comprises two pads. Optionally the distal cross-piece may further be adjustable to be positioned lengthwise along the roof rack, thereby reducing the dimensions of the roof rack when not attached to a car.

In some embodiments, the roof rack may be foldable, nestable, and/or collapsible when not attached to a car. The collapsible roof rack may provide utility in storing or shipping due to a reduced form factor compared to the attached roof rack.

In some embodiments, the distal end of the roof rack may be secured to the roof of the car by the distal cross-piece comprising one or two pads that may support the distal end of the roof rack above the car roof.

Optionally the distal cross-piece may be mounted onto a bottom side of the rack body. The bottom side of the roof rack is the side closest to the roof of the car when the rack is attached to a car. Optionally the distal cross-piece may be connected to the rack body at substantially the same height plane to the rack body.

Optionally a pad comprises a magnet, for example a flex magnet which magnetically couples with the metal of the car roof. Optionally the magnet may be encased in a soft exterior, preventing the magnet from direct contact with the car roof.

Optionally the distal cross-piece may be attached to the rack body by means of a rotatable axis perpendicular to the plane of the rack body, allowing the length of the distal cross-piece to rotate relative to the rack body. Optionally, the length of the distal cross-piece may be rotated to be substantially parallel to the length of the rack body, for example for reduced space storage.

Optionally the rack body comprises a roller. For example, the roller acts as a fulcrum using the length of the rack body as lever to lift the cross-piece pads above the car roof during installation and/or removal of the rack.

In some embodiments the rack wall may be connected to a distal end of the rack body. Optionally the rack wall may be foldable relative to the rack body, such that the rack wall when folded closed is substantially parallel with the length of the rack body, and when folded open forms an angle with the rack body ranging between 60 and 120 degrees.

Optionally, the roof rack may be used for transporting luggage or other items on top of the car. Optionally, the items may be placed on top of a roof rack, and/or optionally may be fastened to the roof rack or racks for example using an accessory mount, rope, string, bungee, and/or any other means of fastening an article to the roof rack or racks.

Exemplary Embodiments

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention, in some embodiments thereof, relates to mechanical device for securing objects to the roof of a vehicle, and more particularly, but not exclusively, to a collapsible car roof rack adaptable to multiple car shapes.

FIG. 1A is a schematic drawing of an open roof rack unit 100 fully extended in accordance with an embodiment of the current invention. Optionally a roof rack unit 100, includes a distal cross-piece 101, a rack body 102a, 102b, a folding hinge 103, a proximal cross-piece 104 and/or an anchor support 105.

Rack Body

In some embodiments, rack body 102a, 102b comprises two elongated pieces along the length of the roof rack, a distal body 102a and/or a proximal body 102b. Optionally, the rack body 102a, 102b may be made from any rigid material, for example any metal, wood, plastic, and/or any other similar material and/or any combination of the aforementioned materials. Optionally, the rack body is foldable and/or collapsible e.g. for easy storage.

Folding Hinge

In some embodiments, components of the rack body 102a, 102b may be interconnected by a folding hinge 103 that may allow the rack to be collapsible along the length. Folding hinge 103 may be located approximately midway between distal end of the distal body 102a (in FIG. 1A the distal cross piece is optionally located at the d and the distal end of the distal body 102a) and proximal end of proximal body 102b (in FIG. 1A cross-piece 104 is optionally shown at the proximal end of proximal body 102b). Alternatively or additionally, the hinge 103 may be located nearer to the distal end and/or nearer to the proximal end. Optionally folding hinge 103 facilitates folding of rack body 102a, 102b downward (as can be seen for example in FIG. 1C) which may have the advantage, that weight of the rack is not causing folding of hinge 103. Alternatively or additionally, folding hinge 103 facilitates folding of rack body 102a, 102b along an upward and/or laterally. Folding hinge 103 may comprise a locking mechanism that prevents the rack body from folding when deployed on a car roof, and/or prevents unfolding when folded. Folding hinge 103 may comprise any mechanism for connecting two foldable pieces, for example a hinge and/or a flexible connector.

Distal Cross-Piece

Figure 2:
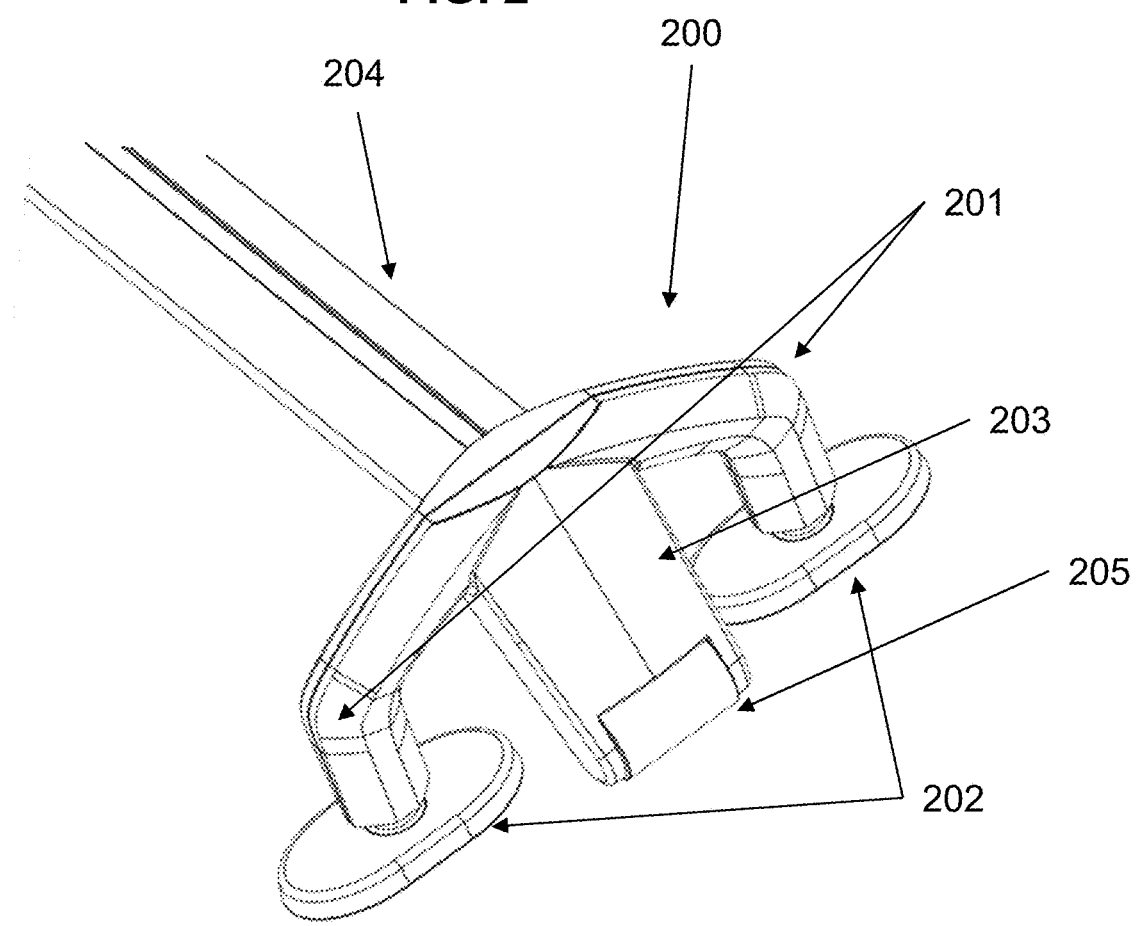
FIG. 2 is schematic drawing of distal cross-piece as seen from a distal viewpoint in accordance with an embodiment of the current invention.

Distal cross-piece 101 may comprise a mechanism for locating the roof rack along a width of a car roof, for example as described in FIG. 2. Optionally, distal cross piece holds distal feet 113 on opposite lateral sides of the rack body 102a. Distancing feet 113 laterally from the body 102a (for example on opposites sides thereof) may increase the stability of the rack unit 100 to lateral forces (e.g. winds caused by forward motion of a car).

Proximal Cross-Piece

Proximal cross piece 104 may be attached to and/or supported by pads 112. In some embodiments, proximal cross piece 104 bows distally. Optionally, the bow in cross piece 104 facilitates extending proximal feet pads 112 proximally beyond the proximal end of the body 102b. Optionally, the anchor support 105 is connected to the body 102b via a telescoping bar 106. Optionally, proximal cross piece holds proximal feet 112 on opposite lateral sides of the body 102b. Distancing feet 112 laterally from the body 102b (for example on opposites sides thereof) may increase the stability of the rack unit 100 to lateral forces (e.g. winds caused by forward motion of a car).

Lever

Optionally lever 110 may comprise an extension from the distal cross-piece extending downwards and sloped away from rack body 102a. Optionally, lever 110 may be used to locate the distal feet 113 of the roof rack and/or to lift the distal feet 113 off the car for example as explained with regards to roller lever 203.

Figure 1B:
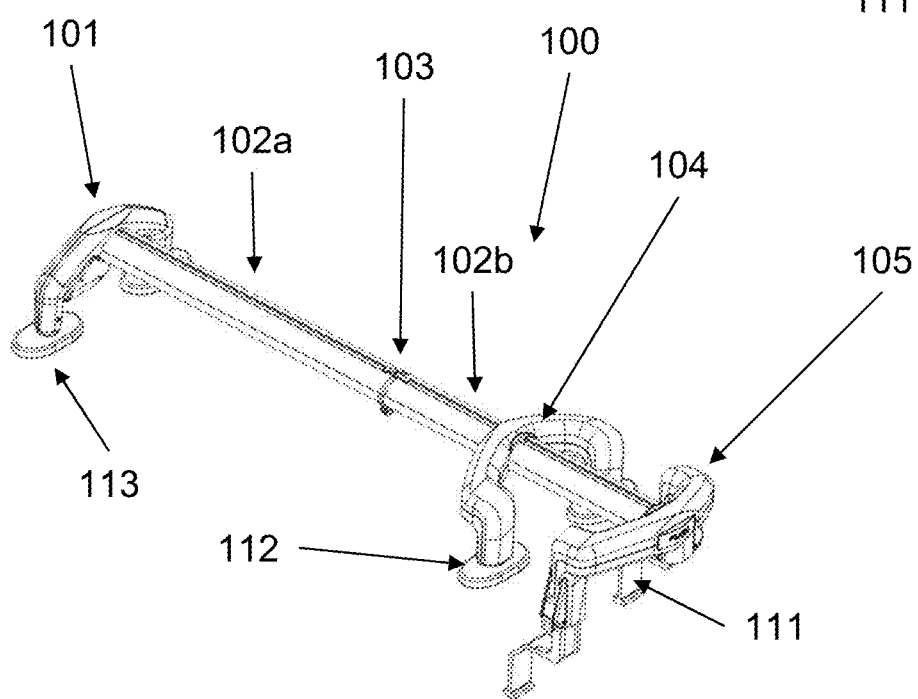
FIG. 1B is a schematic drawing of an open roof rack unit fully retracted in accordance with an embodiment of the current invention.

FIG. 1B is a schematic drawing of an open roof rack unit 100 fully retracted in accordance with an embodiment of the current invention. In some embodiments, the distance between proximal cross piece 101 and distal cross piece 104 may be adjustable. For example, proximal cross piece 104 may slide freely along proximal body 102b. Optionally, the position of proximal cross piece 104 may be locked. For example, changing the distance between distal cross piece 101 and proximal cross piece 104 may facilitate positioning the distal feet 113 near one edge of roof and proximal feet 112 near an opposite edge of a roof for different width car rooves.

In some embodiments, telescoping bar 106 facilitates adjusting a distance between anchor support 105 and distal cross piece 101 (and/or proximal cross piece 104). For example, adjusting this distance between anchor support 105 and distal cross piece may facilitate positioning distal feet near an edge of roof and simultaneously positioning anchors 111 into a door frame of the opposite side of a car for different width cars. Optionally, anchor support holds anchors 111 on opposite lateral sides of the bar 106 and/or rack body 102b. Distancing anchors 111 laterally from the body 102b and/or bar 106 (for example on opposites sides thereof) may increase the stability of the rack unit 100 to lateral forces (e.g. winds caused by forward motion of a car).

Figure 1C:
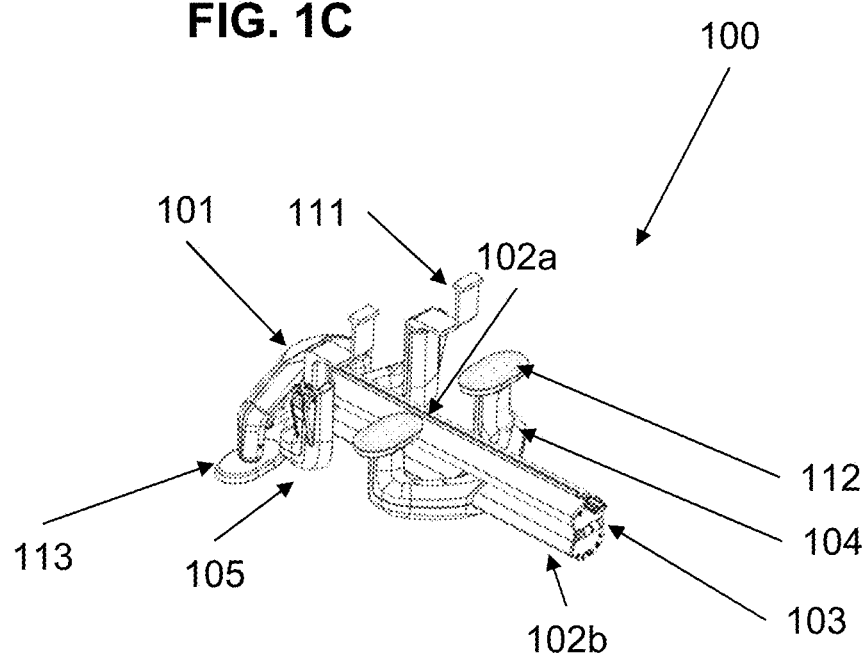
FIG. 1C is a schematic drawing of a folded roof rack unit in accordance with an embodiment of the current invention.

FIG. 1C is a schematic drawing of a folded roof rack unit in accordance with an embodiment of the current invention. In some embodiments, inserting telescoping bar 106 fully into body 102b and/or sliding proximal cross distally along body 102b and/or folding body 102a, 102b facilitates folding the rack unit 100 to a size approximately the size of body 102a or 102b.

Figure 1D:
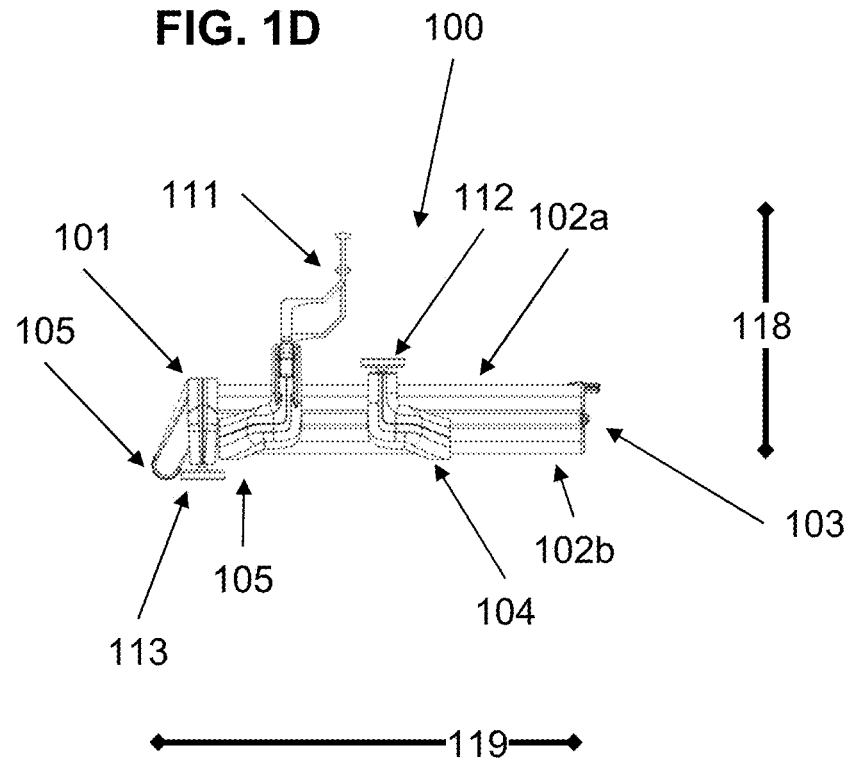
FIG. 1D is an orthogonal view of a folded roof rack unit in accordance with an embodiment of the current invention.

FIG. 1D is an orthogonal view of a folded roof rack unit in accordance with an embodiment of the current invention. In some embodiments, the rack folds to a length 118 between lever 110 and hinge 103 of 599 mm and/or ranging between 590 to 610 mm and/or ranging between 550 to 650 mm. Optionally folding hinge 103 and/or retracting anchors 111 results in a folded unit 100 of height from feet 113 to anchors 111 of 260 mm and/or between 250 to 270 mm and/or between 200 to 300 mm.

Figure 1E:
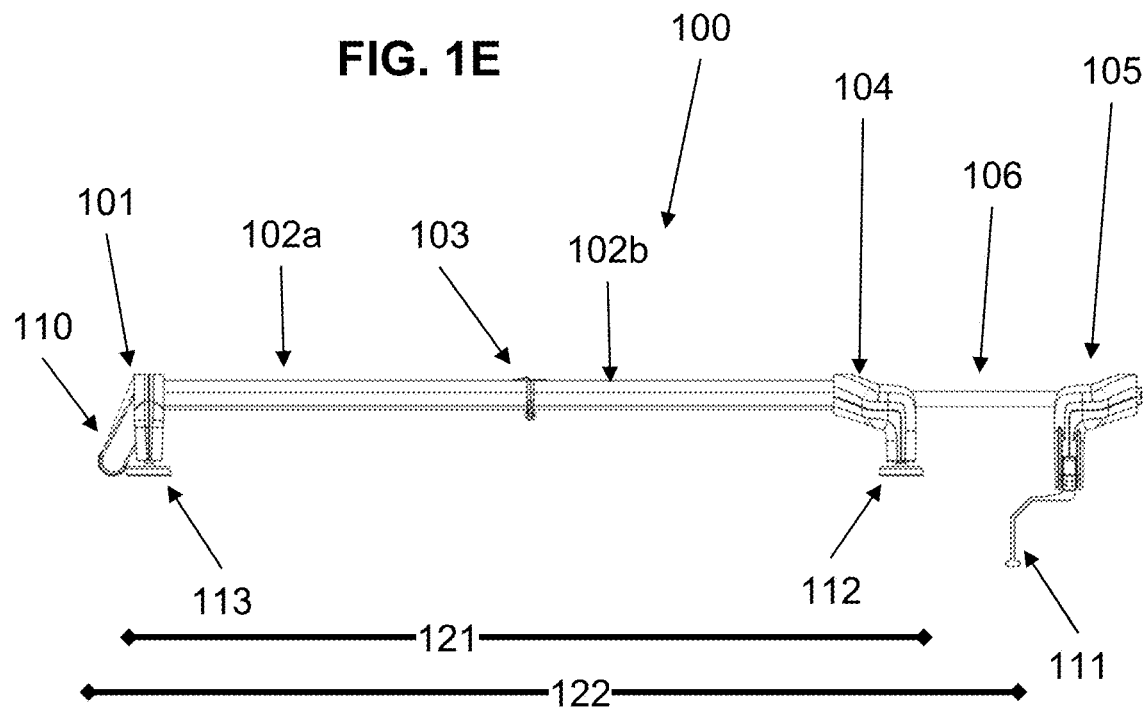
FIG. 1E is an orthogonal view of an open roof rack unit fully extended in accordance with an embodiment of the current invention.

FIG. 1E is an orthogonal view of an open roof rack unit fully extended in accordance with an embodiment of the current invention. In some embodiments, a length 121 of the extended unit 100 from opposite ends of distal feet 113 to proximal feet 112 is 1091 mm and/or may range between 1080 to 1200 mm and/or between 900 to 1200 mm and/or between 700 to 900 mm. In some embodiments, a length 122 of the extended unit 100 from opposite ends of lever 110 to proximal feet 112 is 1250 mm and/or may range between 1240 to 1260 mm and/or between 1200 to 1300 mm and/or between 1000 to 1200 mm. It may be noticed that the maximum distance 121 between distal feet 113 and the proximal anchor 111 may be greater than twice the folded length 119 of the unit 100. For example, this may be facilitated by the combination of the hinge 103 and/or the telescoping bar 106. In some embodiments, the length of the folded rack may be less than half the maximum length from the distal end of the rack (e.g. lever 110 to the proximal end of proximal feet 112). For example, this may be facilitated by the bow of proximal cross piece 104

Figure 1F:
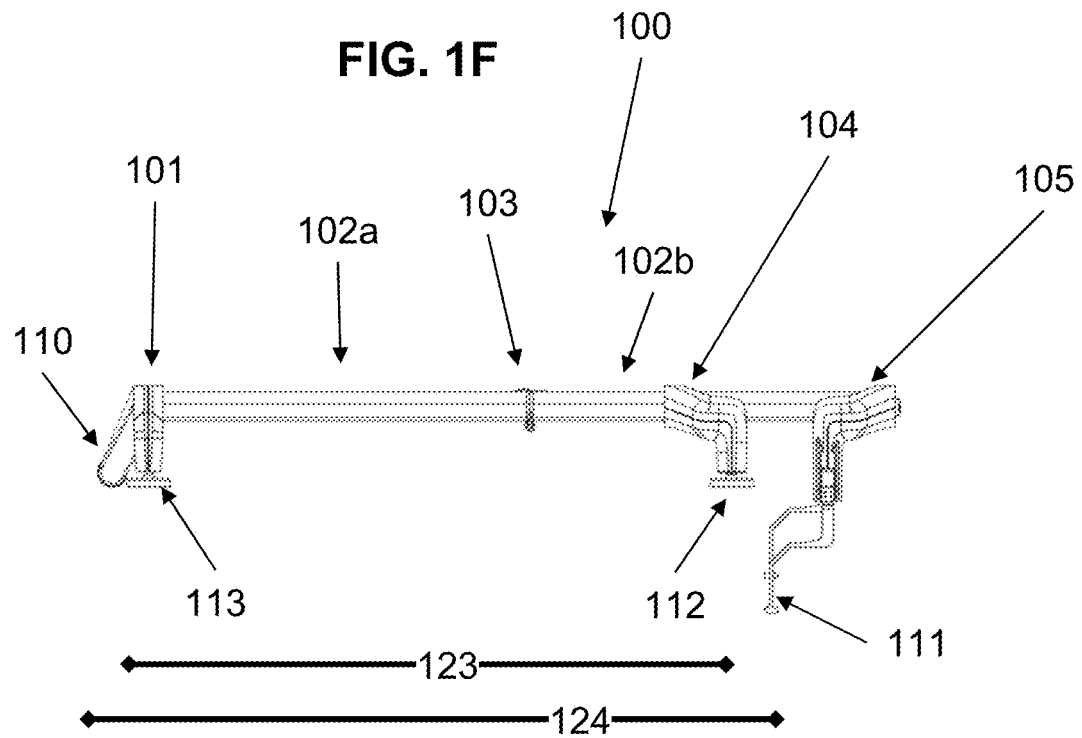
FIG. 1F is an orthogonal view of an open roof rack unit fully retracted in accordance with an embodiment of the current invention.

FIG. 1F is an orthogonal view of an open roof rack unit fully retracted in accordance with an embodiment of the current invention. In some embodiments, a length 123 of the contracted unit 100 from opposite ends of distal feet 113 to proximal feet 112 is 860 mm and/or may range between 850 to 870 mm and/or between 750 to 950 mm. In some embodiments, a length 124 of the contracted unit 100 from opposite ends of lever 110 to proximal feet 112 is 920 mm and/or may range between 910 to 930 mm and/or between 850 to 970 mm and/or between 700 to 850 mm.

FIG. 2 is schematic drawing of distal cross-piece 200 as seen from a distal viewpoint in accordance with an embodiment of the current invention. Optionally the distal cross-piece comprises extensions 201, pads 202, and roller 203, in accordance with an embodiment of the current invention.

Optionally the distal cross piece may be integrally connected to rack body 204.

Extensions

Optionally extensions 201 may slope downwards from the point of connection to the rack body. Optionally extensions 201 may comprise a substantially "U" shape with an open end pointing downward. Optionally the pads may be rigidly connected to the two downward ends of the extension. Optionally the pads may be connected with a flexible joint to extensions 201, thereby allowing the pads to adjust maximum contact area with a car roof that may not be planar and/or parallel to the rack body.

Lever

Optionally roller lever 203 may comprise an extension from the distal cross-piece extending downwards and sloped away from rack body 204 mounted at and extending downwards from a lower extremity of the extension. Optionally, the lever 203 includes a wheel 205 and/or a roller at a lower and/or distal extremity thereof.

Optionally wheel 205 may be rotatable around an axis substantially perpendicular to the length of the rack body.

Optionally, when the rack is horizontal (for example in the embodiment of FIGS. 1A to 1F. the proximal feet 112 and the distal feet 113 are horizontal with respect to each other and/or the body 102a, 102b is horizontal) the bottom of distal feet 113 and/or pads 202 may be lower relative to rack body 204 than wheel 205 (and/or lever 110) when rack body is horizontally placed on a car roof, thereby allowing the pads 202 full contact with an installed car roof without roller lever 203 interfering.

Optionally roller lever 203, 110 may allow a user to tilt the proximal end of the roof rack upwards (for example between 2 to 5 degrees and/or between 5 to 15 degrees and/or between 15 to 30 degrees and/or between 30 to 50 degrees), such that wheel 205 and/or lever 110 comes into contact with a car roof and the pads become elevated above the car roof. In such a configuration, a user may roll distal cross piece 200 on wheel 205 along the width of a roof of a car without the pads contacting and/or coming into proximity with the car roof, thereby preventing a magnetic or frictional element in the pads from coupling with the car roof and/or interfering with the positioning of the roof rack.

Optionally wheel 205 may be of diameter such that an arc of wheel 205 may at least partially insert into a rain gutter at a distal end of a car roof, thereby fixing a location of the distal end of the roof rack in relation to the width of a car. Optionally wheel 205 partially entering the distal rain gutter may comprise a stopping point for rolling the roof rack across a car roof during installation. For example, the diameter of wheel 205 may be 0.5-1.0 cm, 1-2 cm, 2-3 cm, 3-4 cm, 4-5 cm and/or larger than 5cm.

Figure 3:
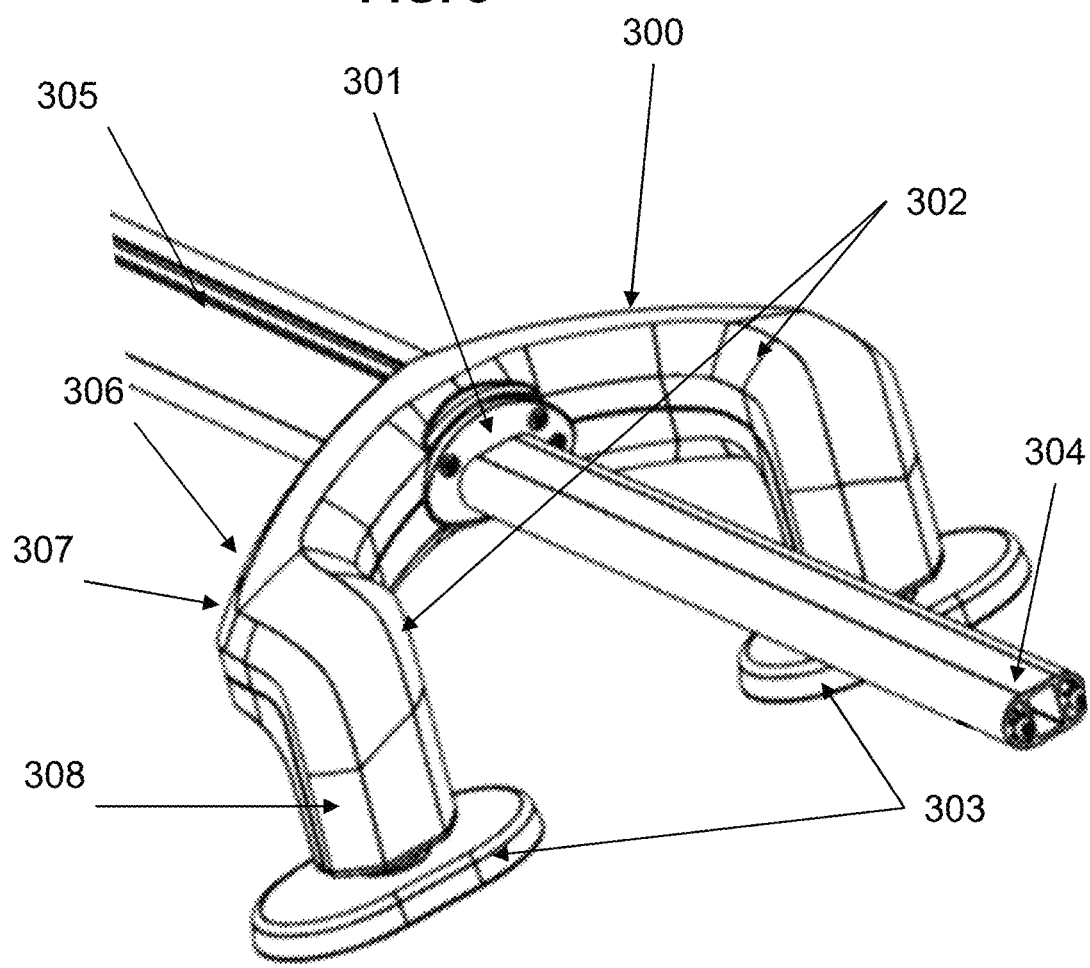
FIG. 3 is schematic drawing of a proximal cross-piece as seen from a proximal viewpoint in accordance with an embodiment of the current invention.

FIG. 3 is schematic drawing of a proximal cross-piece 300 as seen from a proximal viewpoint in accordance with an embodiment of the current invention.

Optionally proximal cross-piece 300 comprises extensions 302 and pads 303. Optionally proximal cross-piece 300 further comprises telescope portal 301.

Figure 5:
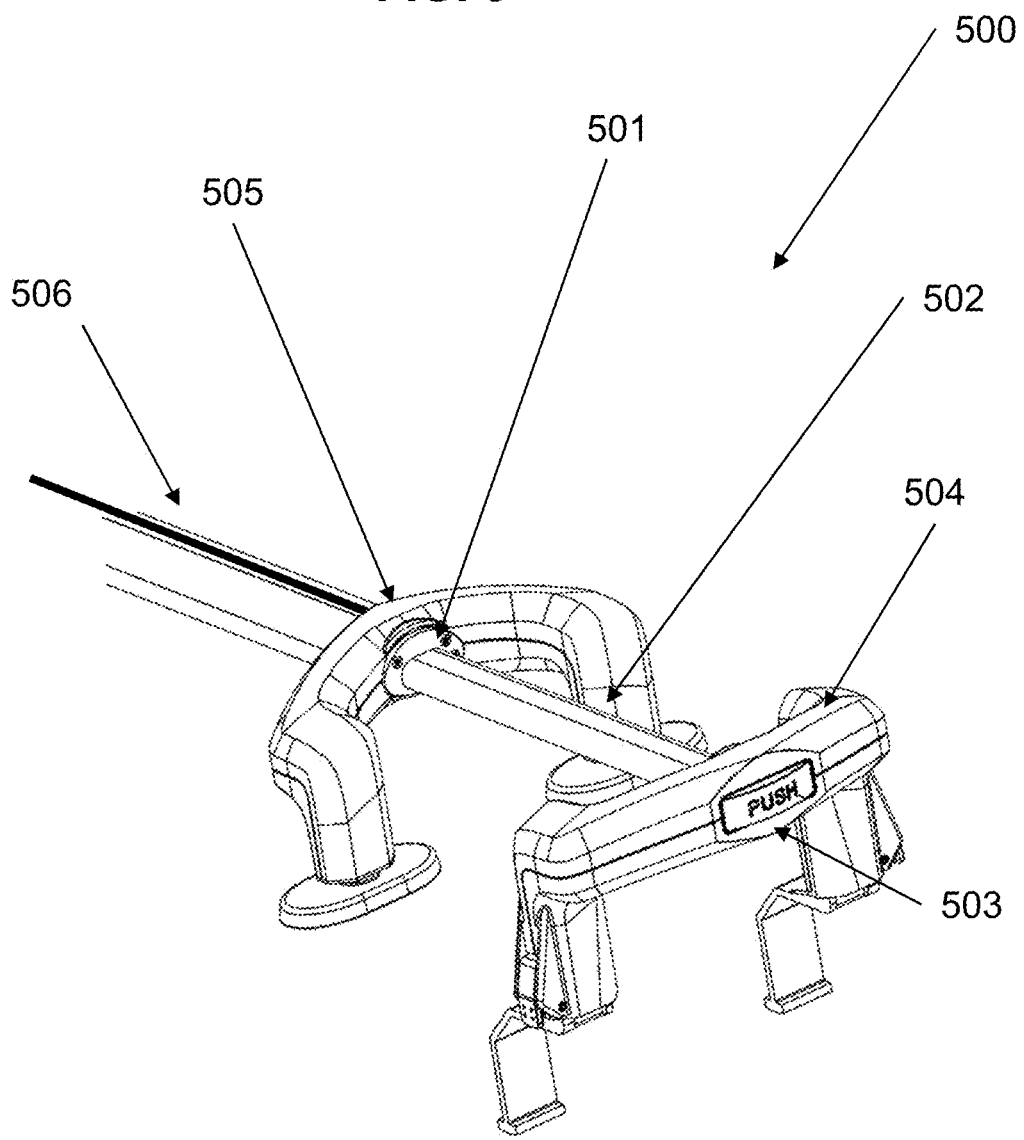
FIG. 5 is schematic drawing of a telescoping mechanism for adjusting a distance between proximal cross-piece and anchor support, as seen from a proximal and lateral viewpoint in accordance with an embodiment of the current invention.

Optionally proximal cross-piece 300 is attached to rack body 305 and a telescope arm may slide into the telescope portal 301 thereby connecting the telescope arm to proximal cross-piece 300, for example as described in FIG. 5.

Extensions and Pads

Optionally extensions 302 may comprise a two opposing opposite substantially mirror image sections comprising a sloping section 306 sloping and/or angled in a proximal direction from an area of connection to rack body 305, an elbow shaped section 307 pointing downwards from sloping section 306, and a downwards section 307 extending downwards from the bottom of elbow shaped section 307, and pads 303 connected to the downward end of the downward section 307.

Optionally, proximal cross-piece 300 comprises a load bearing mechanical connection of pads 303 to rack body 305 and locates pads 303 in a position downwards and in a proximal direction relative to the point of connection of rack body 305 to proximal cross-piece 300.

Optionally pads 303 may be non-magnetic. Optionally pads 303 may be magnetic with a weaker magnetic attraction than pads 202 of the distal cross-piece as shown in FIG. 2.

Figure 4:
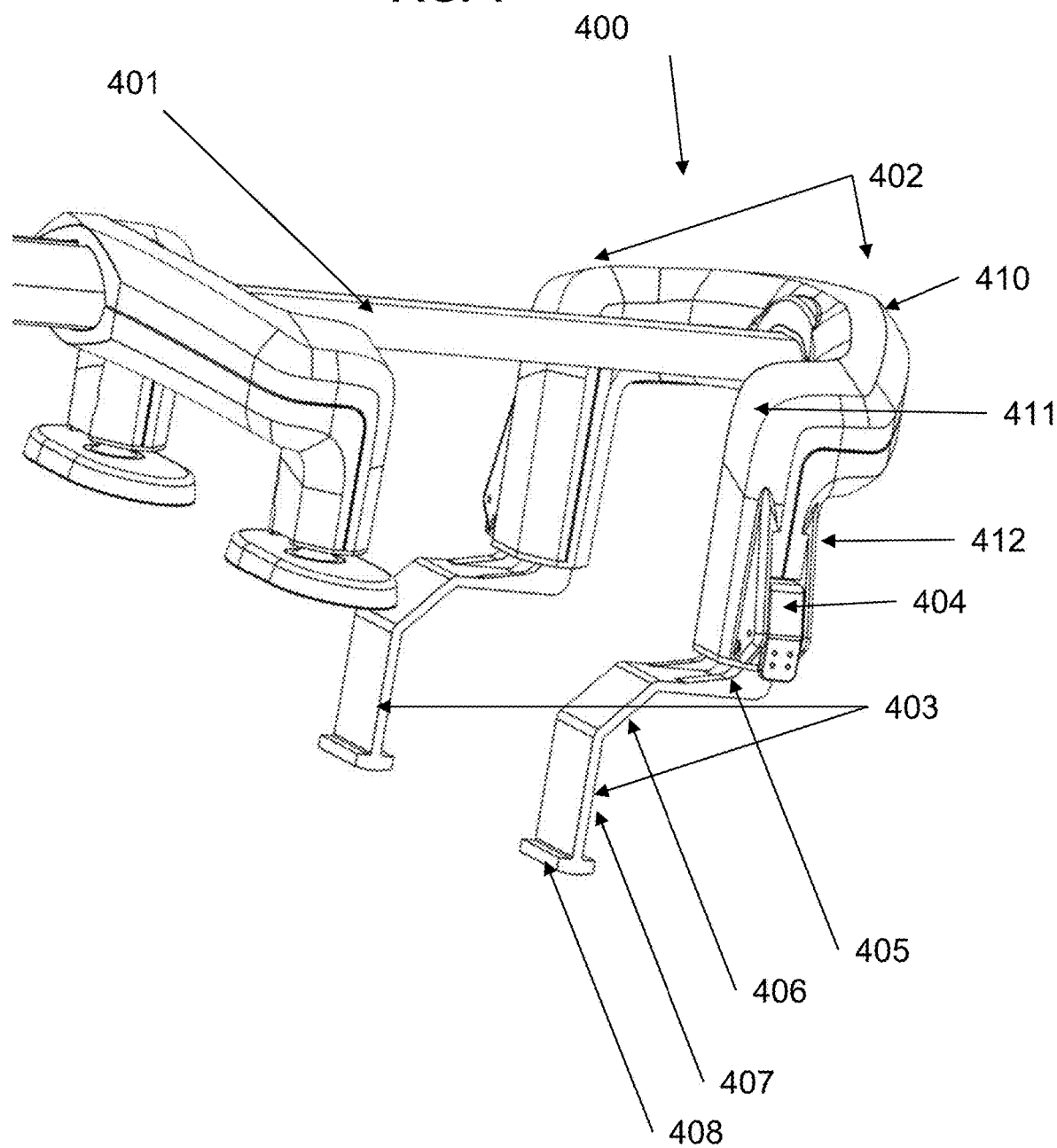
FIG. 4 is schematic drawing of an anchor support as seen from a lateral and distal viewpoint in accordance with an embodiment of the current invention.

Optionally pads 303 may be rigidly connected to downward extensions 307. Optionally pads 303 may be connected with a flexible joint to downward extensions 307, thereby allowing pads 303 to adjust position relative to a non-planar car room, thereby providing maximum contact area with a car roof FIG. 4 is schematic drawing of an anchor support 400 and a distal portion of the roof rack as seen from a lateral viewpoint in accordance with an embodiment of the current invention.

Optionally the anchor support 400 comprises telescoping arm 401, extensions 402, and anchors 403. Optionally, anchors 403 may be height adjustable relative to extensions 402. Optionally, the anchor support further comprises an anchor height lock mechanism 404. Optionally anchor support 400 comprises a connection to a telescoping arm 401, for example as described in FIG. 5.

Anchors

Optionally anchor support 400 may comprise two anchors 403, anchors 403 are optionally attached to a downward extremity of extension 402.

Optionally the anchors 403 comprise an upward extension, connected to a distal pointing elbow 405 extending in a distal direction, distal pointing elbow 405 may be connected to a slanted elbow 406 extending in a downward direction, slanted elbow 406 may be connected to a downward extension 407, and downward extension 407 may comprise flange 408.

Optionally slanted elbow 406 may comprise a planar piece connected at the distal end of distal pointing elbow 405, and connected at an opposite to the downward extension 407, wherein both connections may comprise an angle of approximately 45 degrees, and/or the sum of the angles of both connections comprising approximately 90 degrees.

Optionally flange 408 may comprise an extension extending in a substantially perpendicular direction from the downward extension in a distal, proximal or both distal and proximal directions.

Figure 11:
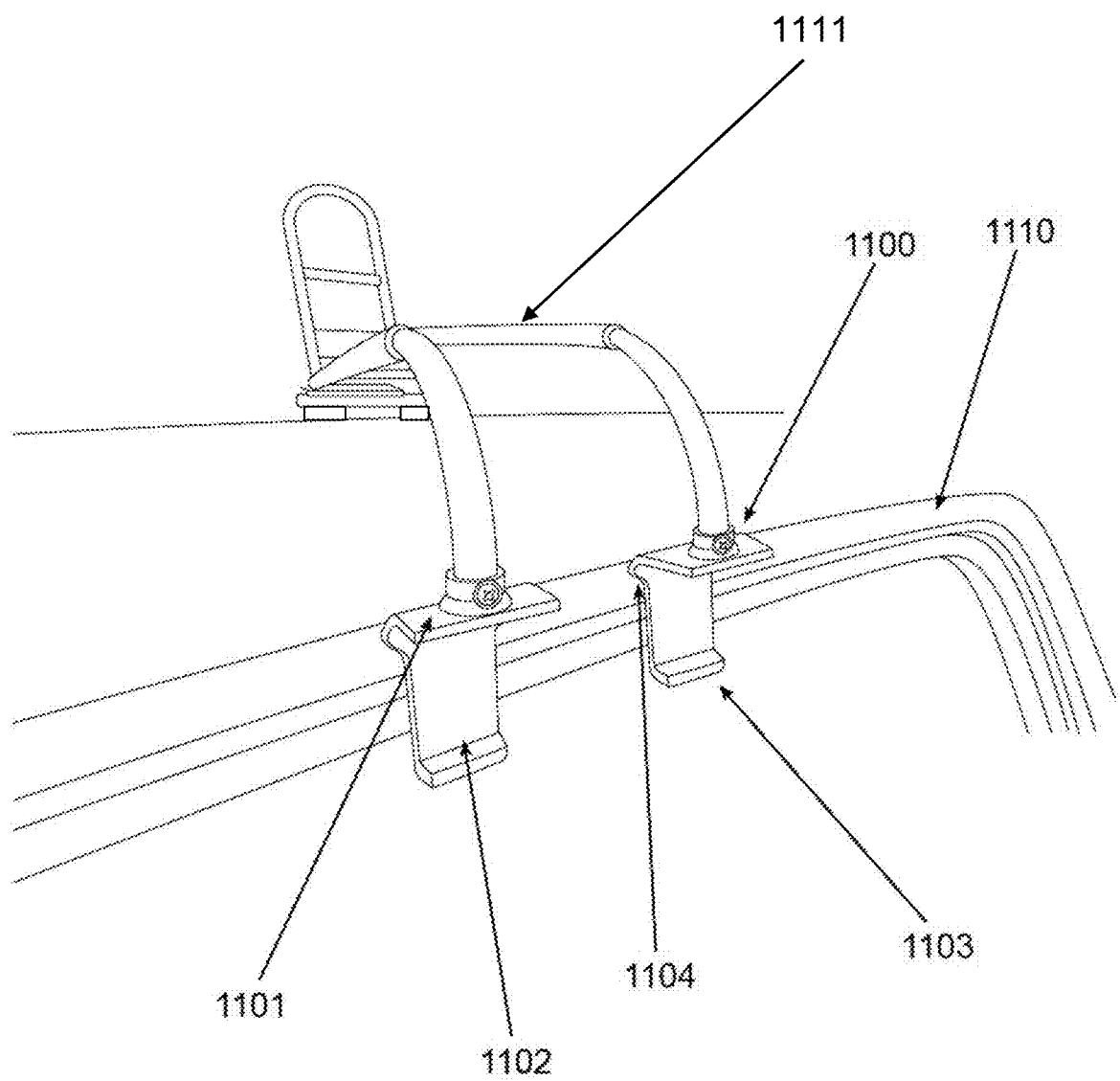
FIG. 11 is an illustration of the anchors situated in the frame of an open car door, in accordance with an embodiment of the present invention.

Optionally anchors 403 may be pliable and/or deformable from the forces applied when placed in a car door frame and a car door is closed, for example as described in FIG. 11.

Extensions

Optionally body of the anchor support 400 may comprise extensions 402 comprising two opposing and substantially symmetrical halves, each half comprising a sloping section 410 sloping and/or angled in a distal and/or downward direction from a center point, elbow section 411 angled downwards from sloping section 410, and downwards section 412 extending from the bottom of the elbow section 411.

Optionally anchors 403 may be connected to the downward end of downward section 412.

Optionally anchor support 400 may locate anchors 403 in a position downwards and in a distal direction relative to a point substantially centered between the symmetrical extensions.

Anchor Height Adjustment and Locking

Optionally anchors 403 may be rigidly connected to the downward ends of downward extensions 407.

Optionally the upward extension of anchors 403 may be inserted within a slot and/or channel in the bottom of downward extension 412. Optionally the depth of insertion may be fixably adjustable, thereby allowing the adjustment of the distance from the top of the car rack body to the bottom of anchors 403.

Optionally the anchor support 400 and/or anchors 403 comprise height locking mechanism 404 for adjusting, locking and/or unlocking the height of the anchor insertion. Optionally height locking mechanism 404 may be a mechanism for locking and unlocking anchors 403 at various levels of insertion of anchor upward extensions within downward extensions 412. Optionally the height locking mechanism may be located within extensions 402, and may comprise a latch, a friction lock, a lever, a compression mechanism, tooth and notch, a piston and hole, and/or any other mechanism for locking and unlocking two pieces to each other at adjustable locations, and may further comprise an actuator on the exterior of at least one of extensions 402 to lock and/or unlock the height of anchors 403.

FIG. 5 is schematic drawing of a telescoping mechanism 500 for adjusting a distance between proximal cross-piece 505 and anchor support 504, as seen from a proximal and lateral viewpoint in accordance with an embodiment of the current invention.

Figure 6:
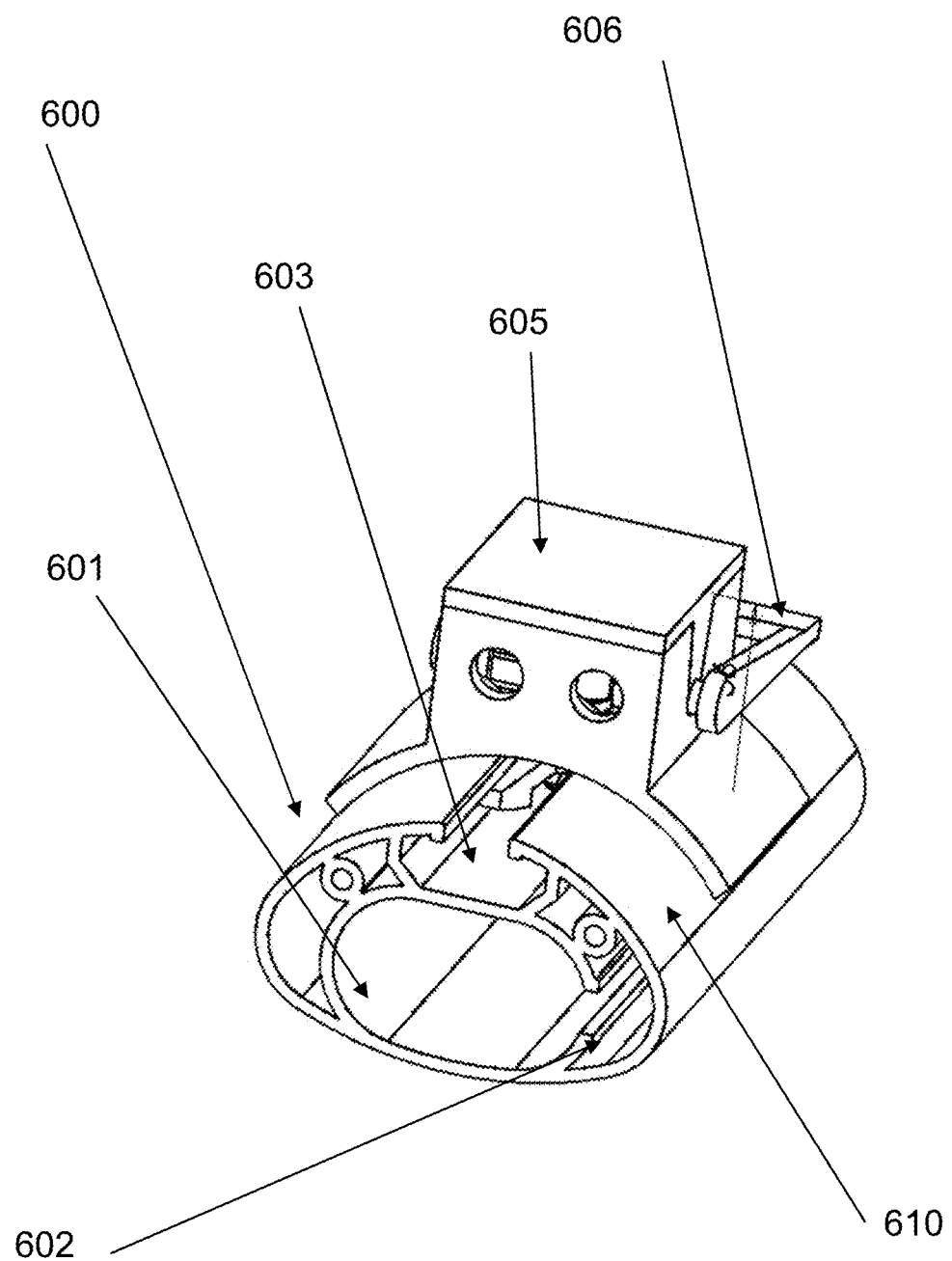
FIG. 6 is schematic drawing of an accessory holder mounted on rack body in accordance with an embodiment of the current invention.

Optionally telescoping rod 502 may be rigidly connected to and extending from anchor support 504 and may be inserted within a telescoping portal 501 to slide within a hollow channel within the rack body 506, for example telescope channel 601 as described in FIG. 6

Ratchet Mechanism

Optionally the hollow channel within rack body 506 and/or telescoping rod 502 may comprise a mechanism, referred to herein as the ratchet mechanism, that allows telescoping rod 502 to be freely inserted within rack body 506, while extraction may include unlocking a releasing a mechanism, for example a ratchet and/or any other locking mechanism. Optionally, the locking mechanism is single directional. Optionally ratchet release 503 comprises a button and/or any other actuator that may release the one-way action of the ratchet mechanism and allow telescoping rod 502 to be partially or fully withdrawn from within rack body 506.

FIG. 6 is schematic drawing of accessory holder 605 mounted on rack body 600 in accordance with an embodiment of the current invention.

Optionally rack body 600 comprises outer shell 610 and inner structures, as shown in the cross-section view of rack body 600. Optionally the inner structure comprises structural elements to enhance rigidity along the length of rack body 600, and empty channels running along the length of rack body 600 to reduce weight and accommodate a ratchet mechanism.

Optionally telescope channel 601 comprises a profile, shape and/or geometry to accommodate insertion of an extending arm for example telescope rod 502 as described in FIG. 5. Optionally ratchet channel 602 comprises a channel with a profile shape and/or geometry to accommodate a ratchet mechanism, for example a ratchet mechanism as described in FIG. 5, and an opening along a length to telescope channel 601.

Optionally ratchet channel 602 and/or the telescope arm may comprise one or more ratchet teeth racks, one or more pawls, and/or any other design, feature, and/or mechanism to enable the ratchet mechanism. Optionally, the ratchet mechanism may be implemented within ratchet channel 602 and/or extending from a telescoping arm within telescope channel 601 to within ratchet channel 602.

Accessory Mount

Optionally rack body 600 outer shell 610 may comprise an opening along a length opening to accessory channel 603. Optionally accessory channel 603 may be wider than the opening in outer shell 610.

Optionally accessories may be mounted onto the roof rack, for example a bicycle rack, a packing case, and/or any other item attachable to a roof rack. Optionally the roof rack may comprise an accessory mount 605 which may be mounted onto the accessory channel 603, wherein accessories may be mounted onto accessory mount 605. Optionally accessory mount 605 comprises runner that may be inserted within accessory channel 603, and moveably attach accessory mount 605 to the rack body, allowing accessory mount 605, either by a user and/or by the manufacturer, to slide along the top of the rack body 600 along accessory channel 603. Optionally the runner may be retracted, folded, and/or otherwise withdrawn to allow inserting and/or removing accessory mount 605 runner to/from accessory channel 603.

Optionally accessory mount 605 comprises a locking mechanism to be locked and unlocked at a location along the length of accessory channel 603. Optionally the locking mechanism may comprise any mechanism for temporarily affixing accessory mount 605 at a location within an accessory channel 603, for example an arm that when extended is pressed against an inner wall of the channel, and/or engages with a gear and/or teeth.

Optionally the locking mechanism may be integrated with the runner, for example the runner may be movable on an axis to extend to contact the inner wall of accessory channel 603.

Optionally latch handle 606 may be an actuator for engaging and/or disengaging the locking mechanism, for example by lifting, pushing, pulling and/or twisting latch handle 606.

Figure 7:
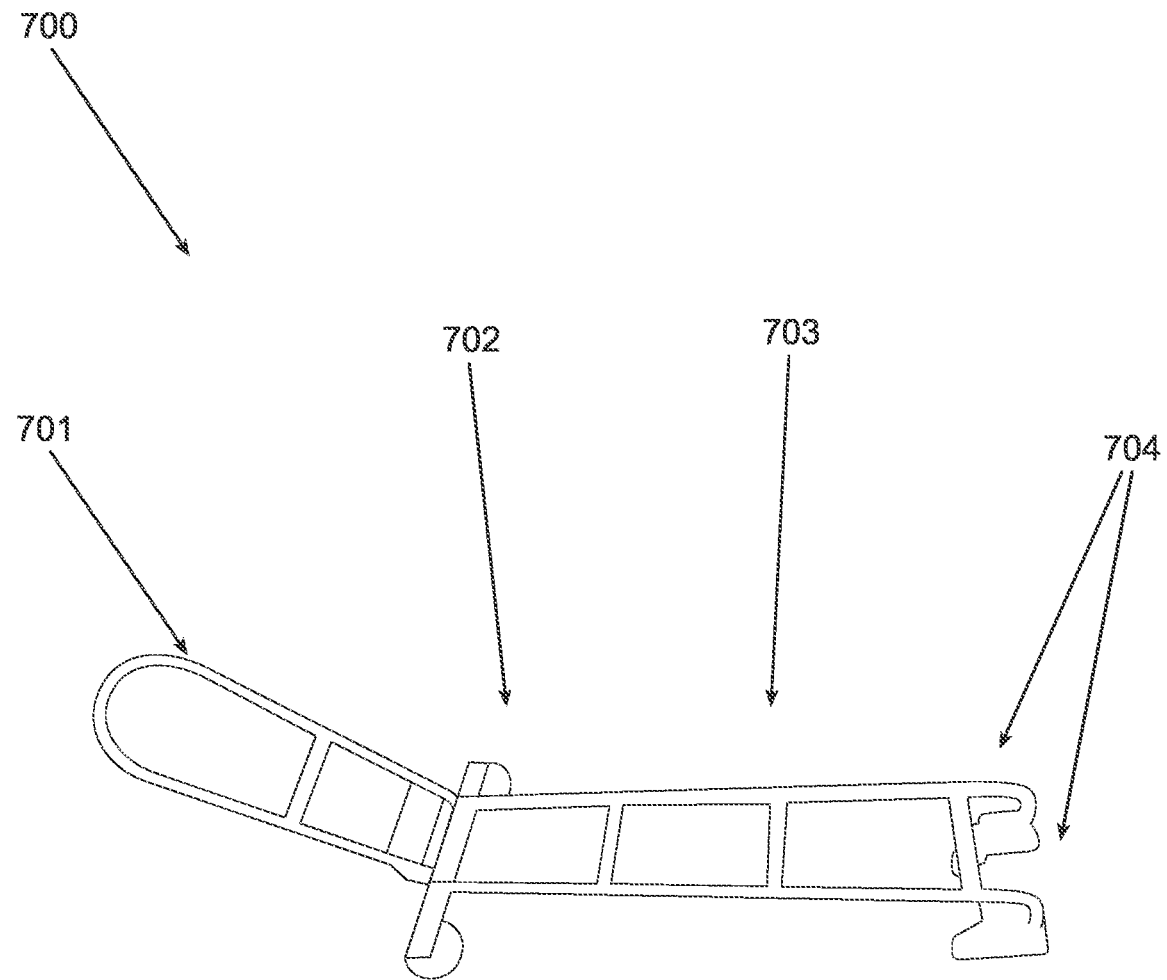
FIG. 7 is an illustration of roof rack unit in accordance with an embodiment of the current invention.

FIG. 7 is an illustration of roof rack unit 700, comprising rack wall 701, distal cross-piece 702, rack body 703, and anchor support 704, in accordance with an embodiment of the current invention.

Rack Body

In some embodiments, roof rack unit 700 comprises two or more rack bodies 703 along a length, where the two rack bodies 703 may be connected by at least two connecting rods. The rack bodies 703 and/or the rods may be made from any rigid material, for example any metal, wood, plastic, and/or any other similar material and/or any combination of the aforementioned materials. In a preferred embodiment, the rack body comprises two rack bodies and three rods.

In some embodiments, rack body 703 may be collapsible along the length and/or the width, for example employing a folding hinge as described in FIG. 1. For example, sections of the rack bodies and/or rods may nest within adjacent sections in the manner of a telescope, and/or the rack bodies and/or rods may have hinges allowing them to fold onto adjacent sections, and/or the rack bodies and/or rods may be collapsible by any other method or configuration. In a preferred embodiment, the rack bodies nest within adjacent sections in the manner of a telescope.

In some embodiments, rack wall 701 may be attached to a distal end of the rack body or at a point between the proximal and distal ends. Optionally the rack wall may be foldable along an axis parallel to the rack body width. Optionally the rack wall when folded may be substantially flush with the rack body. Optionally the rack wall when unfolded may form an angle of between 60 and 120 degrees with the lengthwise plane of the top of the rack body. Optionally the rack wall may be located at a plurality of locations along the length of the rack body.

Figure 8:
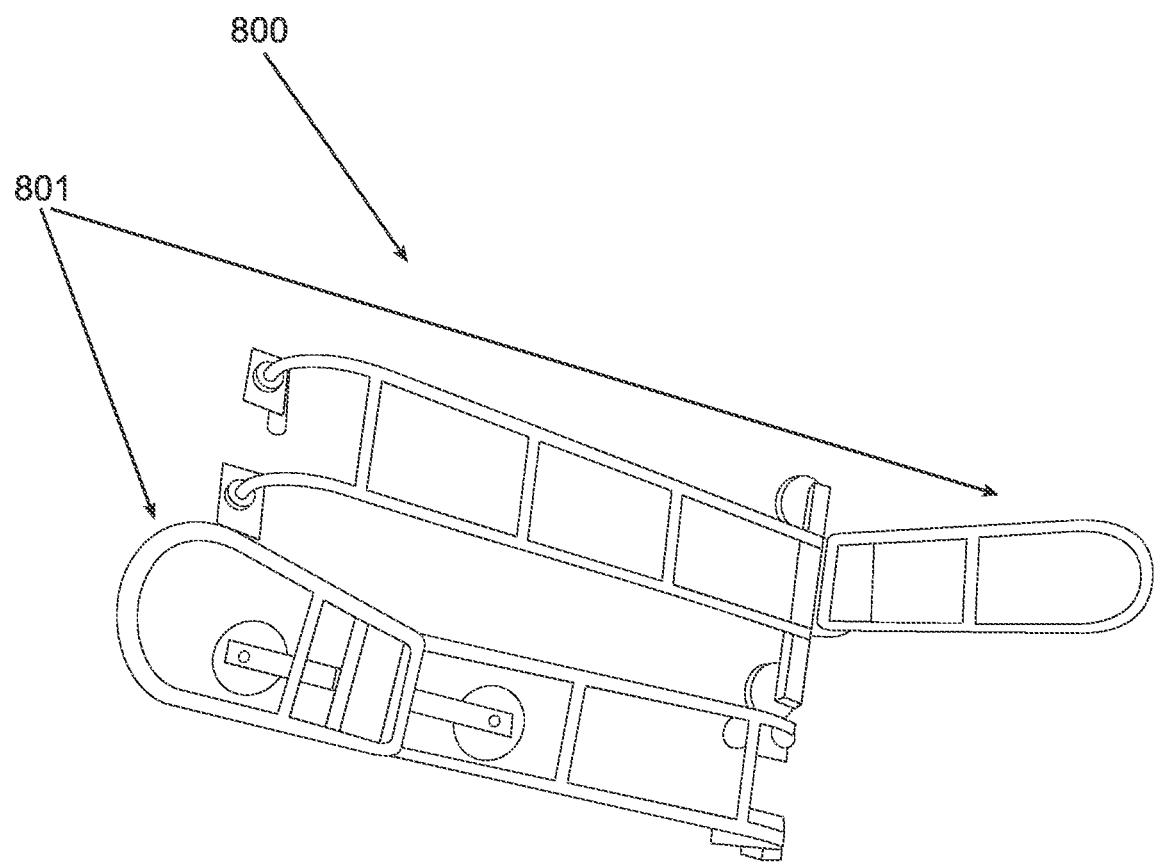
FIG. 8 is an illustration of a pair of roof rack units, in accordance with an embodiment of the present invention.

FIG. 8 is an illustration of a pair of roof rack units 800, in accordance with an embodiment of the present invention. Optionally, a pair of the roof racks may be attached in parallel to a car roof, thereby allowing packages, luggage, and or any other article transportable on the roof of a car to be placed on top of both roof racks. Optionally, when two or more roof racks are attached in parallel to the roof of a car, the roof racks may be arranged with rack wall 801 on alternating sides of the car.

Figure 9:
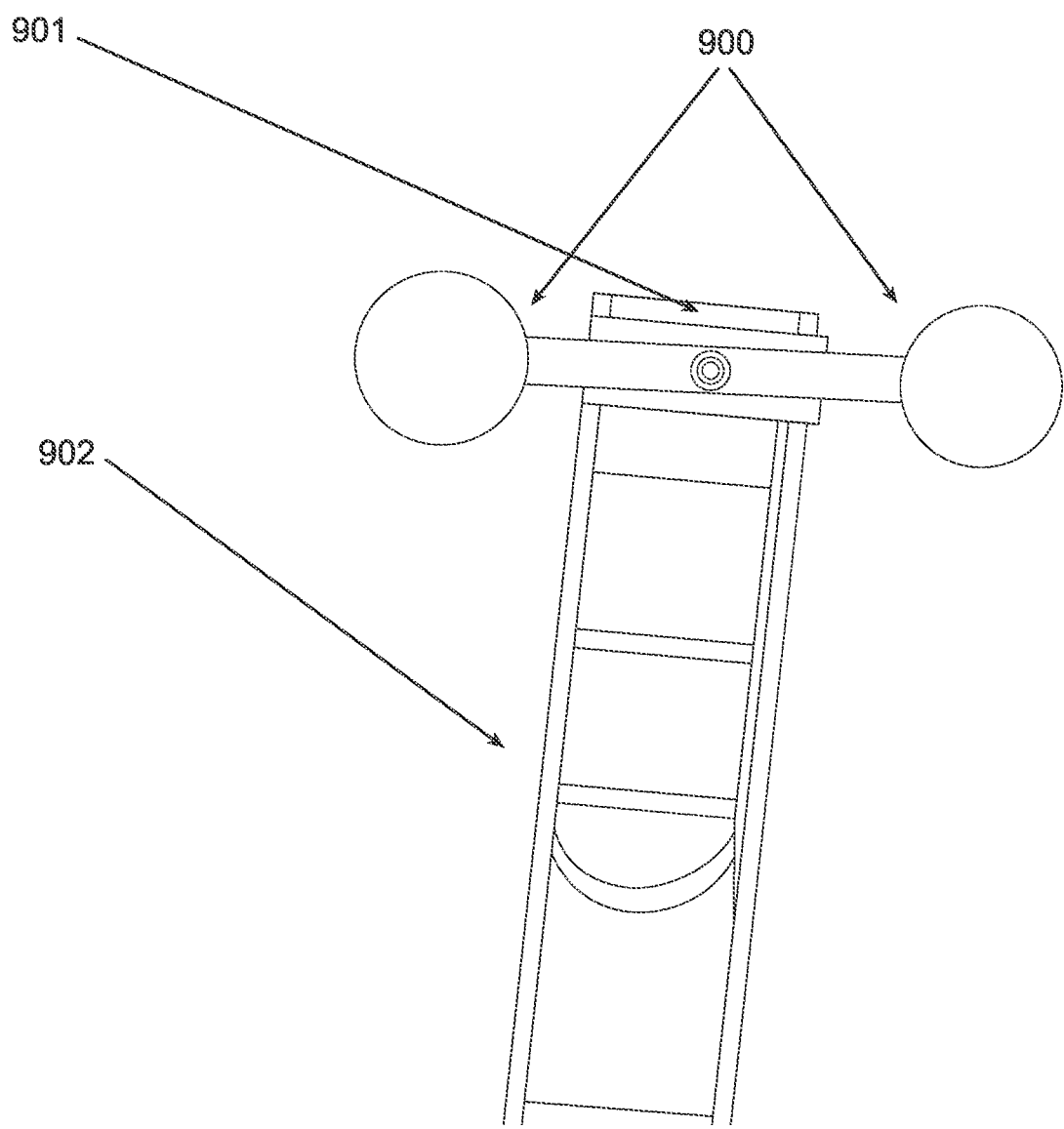
FIG. 9 is an illustration of distal cross-piece and pads as viewed from the bottom of the roof rack, in accordance with an embodiment of the present invention.

FIG. 9 is an illustration of distal cross-piece and pads 900 as viewed from the bottom of the roof rack, in accordance with an embodiment of the present invention. Optionally the pads are placed on the roof of a car when the roof rack is mounted on a car. Optionally the pads may have a surface that contacts the car roof, the surface may be made of rubber, plastic, synthetic rubber, and/or any other material or composite that is softer and/or more elastic than car paint and/or car paint clearcoat, and/or any material that when moved across a portion of a car roof in any direction with a downward force equivalent to the weight of at least 1 gram slides above the outermost layer of paint or clearcoat on a car. Optionally the pad surface has the property of not scratching car paint or clearcoat. Optionally the surface of the pads may have a static sliding coefficient of friction with the clearcoat or outermost paint layer of a car of at least 0.1. In a preferred embodiment, the pad surface has a static sliding coefficient of friction with the clearcoat or outermost paint layer of a car of at least 2.

Optionally pads 900 may be mounted on distal cross-piece 901 which may be mounted on the bottom side of the rack body 902. Optionally distal cross-piece 901 may be attached to the rack body by means of a rotatable axis perpendicular to the plane of the rack body, allowing the length of the distal cross-piece to rotate relative to the rack body. Optionally, the length of the distal cross-piece may be rotated to be substantially parallel to the length of the rack body, thereby decreasing the profile of the roof rack for storage or shipment. Optionally the distal cross-piece may comprise two wings mounted on a hinge on the axis, allowing each wing to fold on the axis to a position substantially parallel with the length of the roof rack.

Optionally, pads 900 may comprise a plurality of magnets embedded beneath the pad surface. For example, the embedded magnets may be circular, square, and/or any other shape and may be distributed randomly, in a circular formation, and/or any other distribution.

Figure 10:
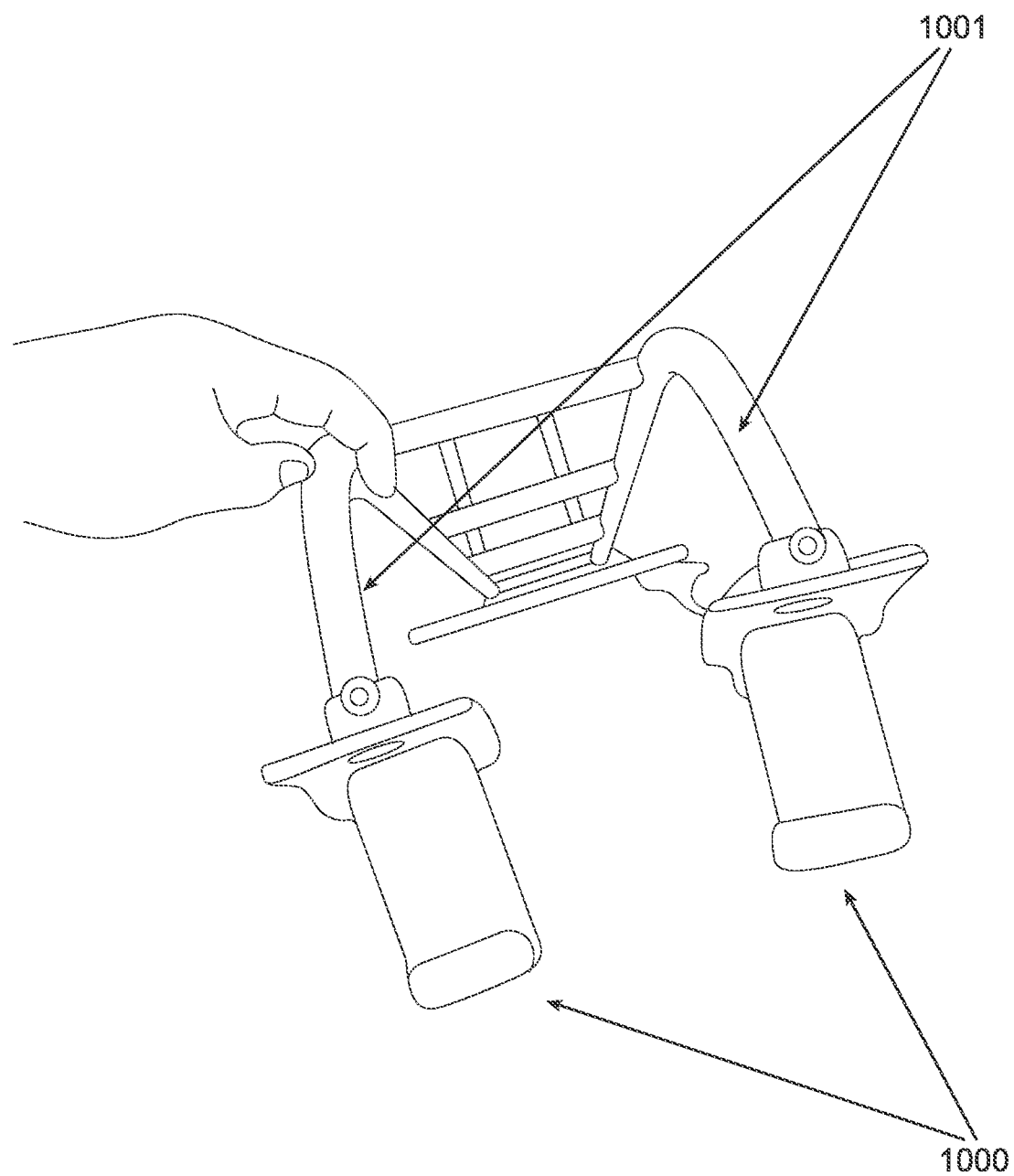
FIG. 10 is an illustration of anchors, as viewed from the proximal end of the roof rack, in accordance with an embodiment of the present invention.

FIG. 10 is an illustration of anchors 1000, as viewed from the proximal end of the roof rack, in accordance with an embodiment of the present invention.

Optionally, an anchor may be attached directly to a proximal portion 1001 of rack body.

Optionally, rack body comprises at or near the proximal end a portion 1001 that slopes and/or angles downward, such that anchors 1000 may be substantially perpendicular to the end portion 1001 of the rack body.

Optionally, the connection between proximal portion 1001 rack body and anchors 1000 may be adjustable, for example allowing an adjustable and fixable amount of overlap between proximal portion 1001 rack body and anchors 1000. For example, anchors 1000 may be insertable within a cavity and/or channel in and/or on the proximal portion 1001 of rack body, thereby allowing a user when adjusting the amount of overlap to adjust a height of proximal portion 1001 relative to anchors 1000 when the roof rack is mounted on a car roof.

FIG. 11 is an illustration of the anchors 1100 situated in the frame 1110 of an open car door, in accordance with an embodiment of the present invention. Optionally, anchor 1100 comprises horizontal flange 1101, vertical flange 1102, at least one lower protrusion 1103, and at least one upper protrusion 1104. Optionally, rack body 1111 connects directly to horizontal flange 1101. In some embodiments, horizontal flange 1101 and/or an upper protrusion may support the weight of the roof rack. For example, the weight may be supported on the door frame. Alternatively or additionally, the roof rack may have one or more feet which support all or part of the weight of the rack. For example, in the embodiment of FIG. 14 the weight of the rack is supported at a proximal side by the anchor support and/or on the distal side by magnetic pads of the distal cross-piece. For example, anchors 1100 may include a flange and/or upper protrusion that supports weight on the door and/or door frame. In some embodiments, the proximal portion may have a foot and/or flange. For example, the foot and/or flange may support all or some of the weight of the rack and/or anything attached to the roof rack on the roof of the vehicle.

Optionally, anchors 1100 may be partially or fully encased in a material that is both more pliable and softer than metal, for example some form or composite of rubber, plastic, fabric, artificial rubber and/or any other material with a shore scaling substantially similar to rubber. Optionally the anchor interior comprises a form of rubber, plastic, artificial rubber, or any other material with a shore scale rating substantially similar to rubber.

Optionally, the anchor interior comprises a metal and/or metal composite that is of a thickness that allows deformation of the anchor by force exerted by the closed door and the door frame, thereby partially and/or substantially deforming the anchor or parts thereof to the shape of the space between the closed door and the door frame.

Optionally, the shore scale rating and/or ductile property and/or pliability and/or stiffness and/or flexibility of the anchor may be substantially similar to that of clay, and/or a copper plate of a thickness of less than 2 millimeters and/or any other substance or composite that is non liquid and is deformable from a force of between 0.1 and 50 Newtons. For example, the hardness of the coating may range between Shore A 40 to 60 and/or Shore A 60 to 80 and/or shore D 30 to 50 and/or Shore D 50 to 70 and/or Shore D 70 to 100.

Optionally the stiffness of upper protrusion 1104 and/or lower protrusion 1103 and/or the surrounding areas thereof may be substantially greater than the stiffness of the anchor as a whole.

Optionally, the rack body, which may be substantially horizontal when placed on the roof of a car, connects to the anchor support 1100 in a substantially vertical direction. Optionally, the proximal end of the rack bodies may be formed substantially in a curve, an arc, an elbow, or any other formation wherein the rack bodies proximal ends may be substantially perpendicular to the length of the rack body. Optionally at least one extension pole may be attached to the rack body pole at an angle allowing the extension rack bodies to attach to anchor 1100 when anchor 1100 is substantially perpendicular to the length of the roof rack.

Optionally, when mounting the roof rack on the roof of a vehicle, anchor 1100 may be located flush with the upper edge of a car door frame.

Figure 12:
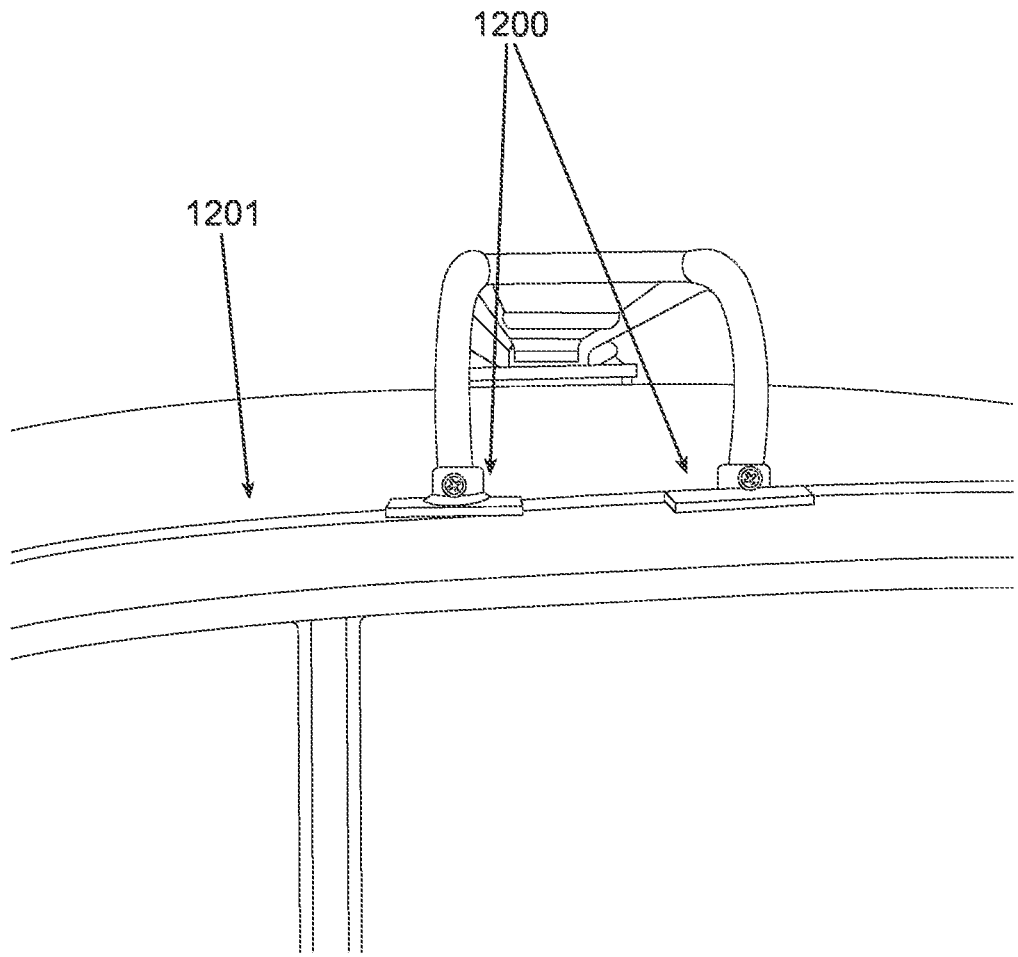
FIG. 12 is an illustration of the anchor sandwiched between a door and a frame of a car where the car door is shut closed, in accordance with an embodiment of the present invention.

FIG. 12 is an illustration of the anchor 1200 situated in car door frame 1201 where the car door is shut closed, in accordance with an embodiment of the present invention.

Figure 13:
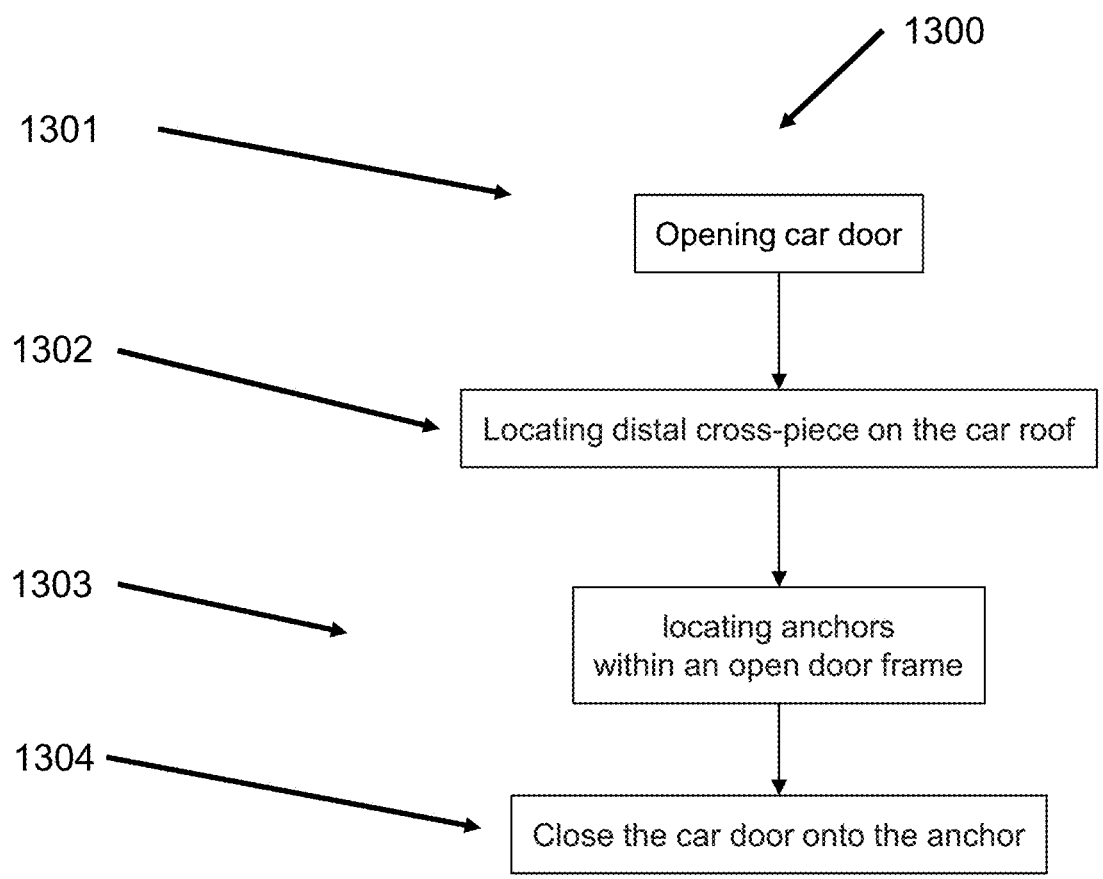
FIG. 13 is a flow chart of a method of attaching the roof rack to the roof of a car, in accordance with an embodiment of the present invention.

FIG. 13 is a flow chart 1300 of a method of attaching the roof rack to the roof of a car, in accordance with an embodiment of the present invention. Optionally, step 1301 comprises opening a car door adjacent to an area on the car roof where the roof rack will be placed.

Optionally this step may be performed at any later stage prior to the last step of closing the car door.

Optionally step 1302 comprises locating the distal cross-piece on the car roof.

Optionally step 1302 may comprise rolling the distal cross piece along a width of the car roof until a roller enters a car rain gutter at a distal car roof side.

Optionally step 1302 comprises adjusting the distal cross-piece so that it is substantially perpendicular with the length of the rack.

Optionally step 1302 may be the first step, or may be any other step up to and including the last step. Optionally step 1302 may be excluded when the roof rack units are not equipped with an adjustable distal cross-piece.

Optionally, the step 1303 comprises placing roof rack anchors along an upper ridge of the door frame of the open door, in contact with the door frame.

Optionally an anchor upper flange is located above the top of the door frame, and/or an anchor lower flange is located below the bottom of the door frame.

Optionally the anchor upper flange may be inserted into an indentation or channel in the door frame, and/or resting on a lower lip of the indentation or channel, thereby supporting the proximal end of the roof rack above the roof of the car.

Optionally step 1303 may comprise adjusting an amount of overlap between the anchors and the rack body and/or an anchor support.

Optionally step 1303 may comprise reducing a distance between the anchor and/or anchor support and the distal cross-piece by a ratchet mechanism, thereby laterally engaging the roof rack with the car roof.

Optionally step 1304 comprises closing the car door, whereby the portion of the anchor located within the car door frame is deformed to fit between the car door frame and the closed car door.

Optionally the method further comprises opening the car door and releasing the ratchet mechanism to free the roof rack from lateral engagement with the car roof.

Optionally, all steps of this method are accomplished by hand, without use of tools or accessories.

Figure 14:
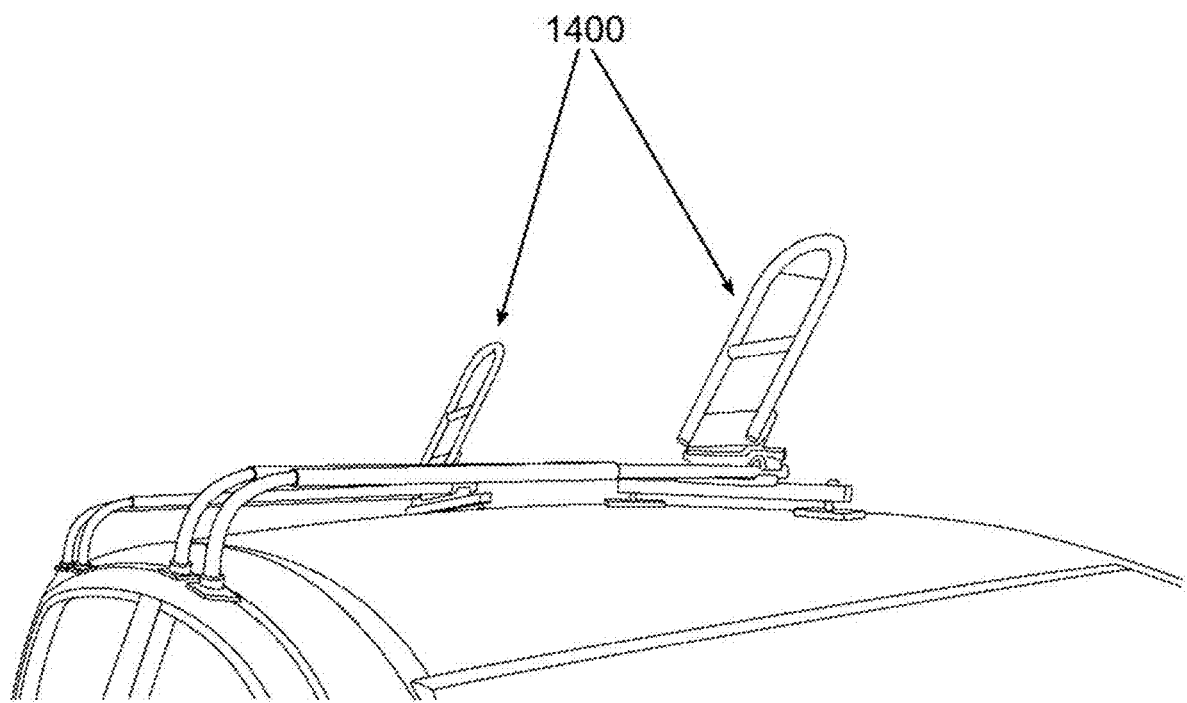
FIG. 14 is an illustration of a pair of roof rack units installed on the roof of a car, in accordance with an embodiment of the present invention.

FIG. 14 is an illustration of a pair of roof rack units 1400 installed on the roof of a car, in accordance with an embodiment of the present invention.

Optionally, when the roof rack units are mounted on a car, the cross piece may hold pads and/or feet distanced apart along the length of the roof of the vehicle. For example, this may add to the stability of the rack and/or its resistance to tilt due to head winds as the vehicle travels. For example, the distance along the length of the car between the pads and/or feet may range between 5 to 10 cm and/or between 10 to 30 cm and/or between 30 to 60 cm and/or between 60 to 100 cm.

Figure 15:
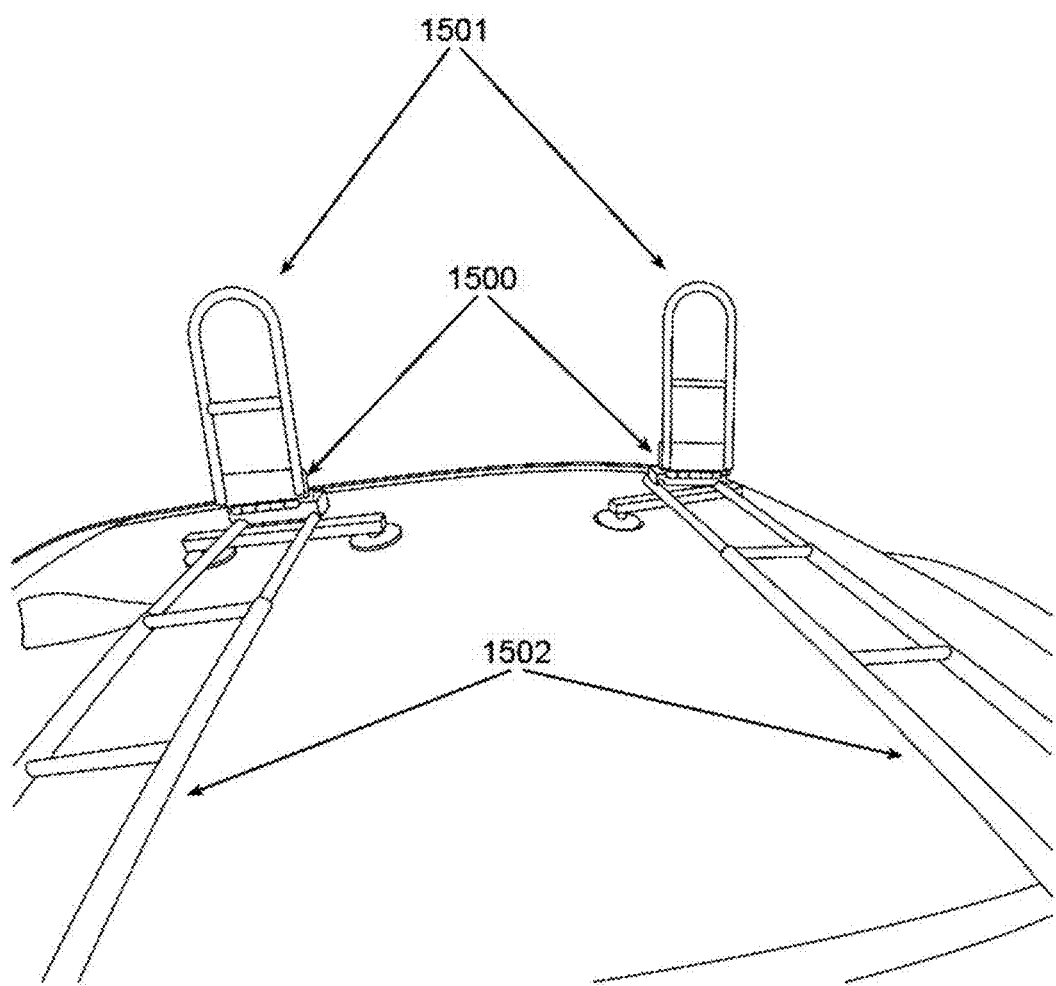
FIG. 15 is an illustrations of roof rack with cross pieces extended, in accordance with embodiments of the present invention.

FIG. 15 is an illustrations of roof rack 1500 with cross pieces 1501 fully extended, in accordance with embodiments of the present invention. Optionally, cross piece 1501 may be extended by rotation. Alternatively or additionally, cross piece 1501 and/or rack body 1502 may telescope and/or fold on a hinge and/or extend in another way. In some embodiments, the anchor support may steady the roof rack. Optionally, most of the weight of the rack may be support on the roof (for example on distal and/or proximal feet. Alternatively or additionally, the anchor may support part of the weight. For example, the weight of the rack may rest on the roof of the car (for example on magnetic pads and/or on a foot. Optionally, the rack may have multiple cross pieces (for example on opposite sides of the body of the rack). Each cross piece may have one or more magnetic pads and/or one or more feet. For example, the foot may be a simple piece of soft rubber or plastic. For example, the hardness of the foot may range between Shore A 40 to 60 and/or Shore A 60 to 80 and/or shore D 30 to 50 and/or Shore D 50 to 70 and/or Shore D 70 to 100. Optionally, the anchor support may comprise a vertical flange, for example vertical flange 1102 as shown in FIG. 11. The term vertical flange refers herein to a flange that fits between the door and the door frame of a vehicle. Optionally the vertical flange may be malleable and/or may be bent away from the vertical. For example, the vertical flange may be directed at an angle between 0 to 10 degrees and/or between 10 to 30 degrees and/or between 30 to 45 degrees and/or between 45 to 60 degrees and/or between 60 to 90 degrees of vertical. Optionally, an anchor may have vertical flange but no horizontal flange and/or no upper protrusion. Optionally a vertical flange may have a thin malleable skeleton (e.g. of malleable metal) and/or a soft coating (e.g. of elastomer for example plastic, rubber or silicone). For example, the hardness of the coating may range between Shore A 40 to 60 and/or Shore A 60 to 80 and/or shore D 30 to 50 and/or Shore D 50 to 70 and/or Shore D 70 to 100. The vertical flange may be straight, curved and/or folded in shape. The vertical flange may have a length between 1 to 3 cm and/or less than 1 cm and/or between 3 to 6 cm and/or between 6 to 10 cm. The vertical flange may have a width between 1 to 3 cm and/or less than 1 cm and/or between 3 to 6 cm and/or between 6 to 10 cm and/or between 10 to 30 cm. A vertical flange may have a thickness ranging between 0.2 to 1 mm and/or between 1 to 3 mm and/or between 3 to 6 mm and/or between 6 to 10 mm and/or between 10 to 20 mm. A protrusion may protrude from the vertical flange by between 0.2 to 1 mm and/or between 1 to 3 mm and/or between 3 to 6 mm and/or between 6 to 10 mm and/or between 10 to 20 mm.

Figure 16:
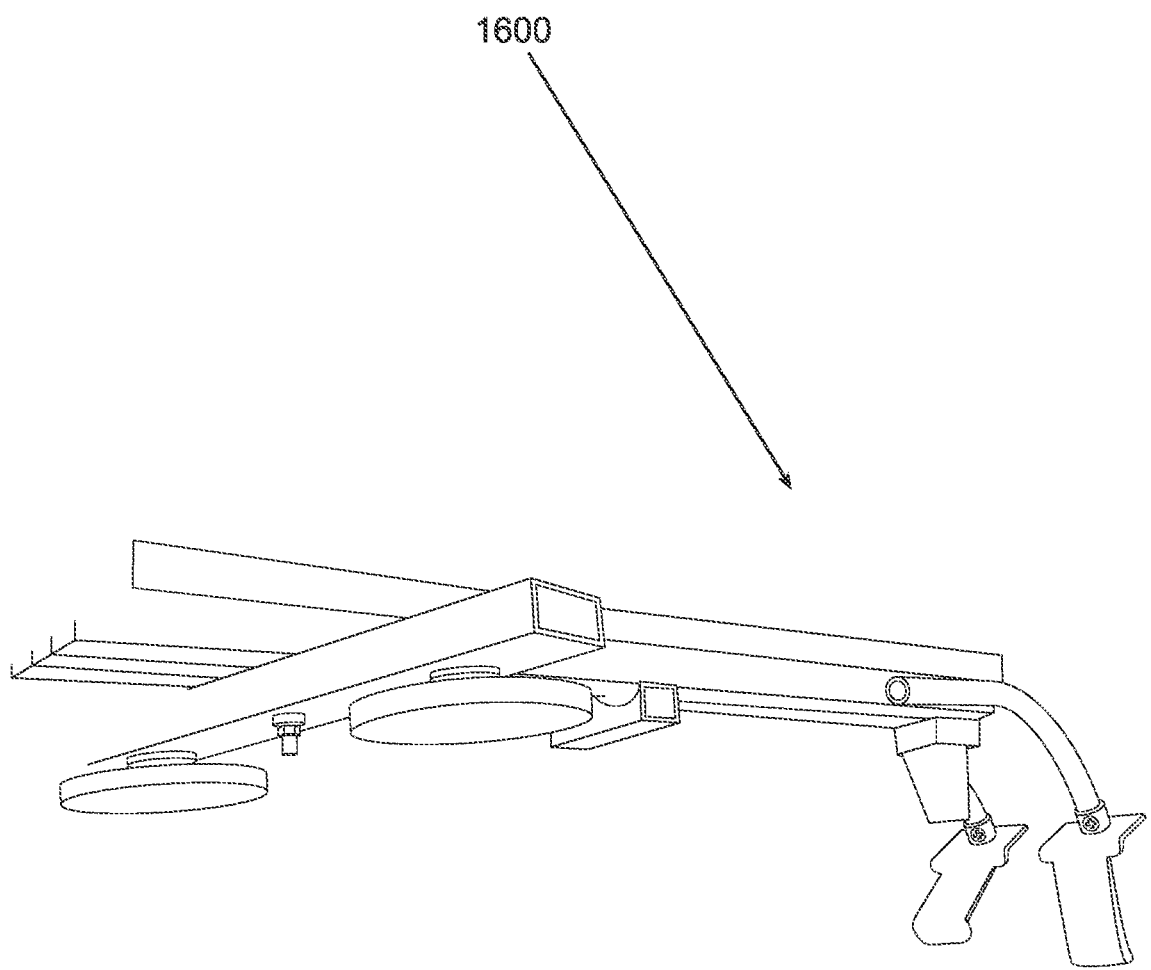
FIG. 16 is an illustrations of roof rack as viewed from a distal viewpoint, in accordance with embodiments of the present invention.

FIG. 16 is an illustrations of roof rack 1600 as viewed from a distal viewpoint, in accordance with embodiments of the present invention.

Figure 17A:
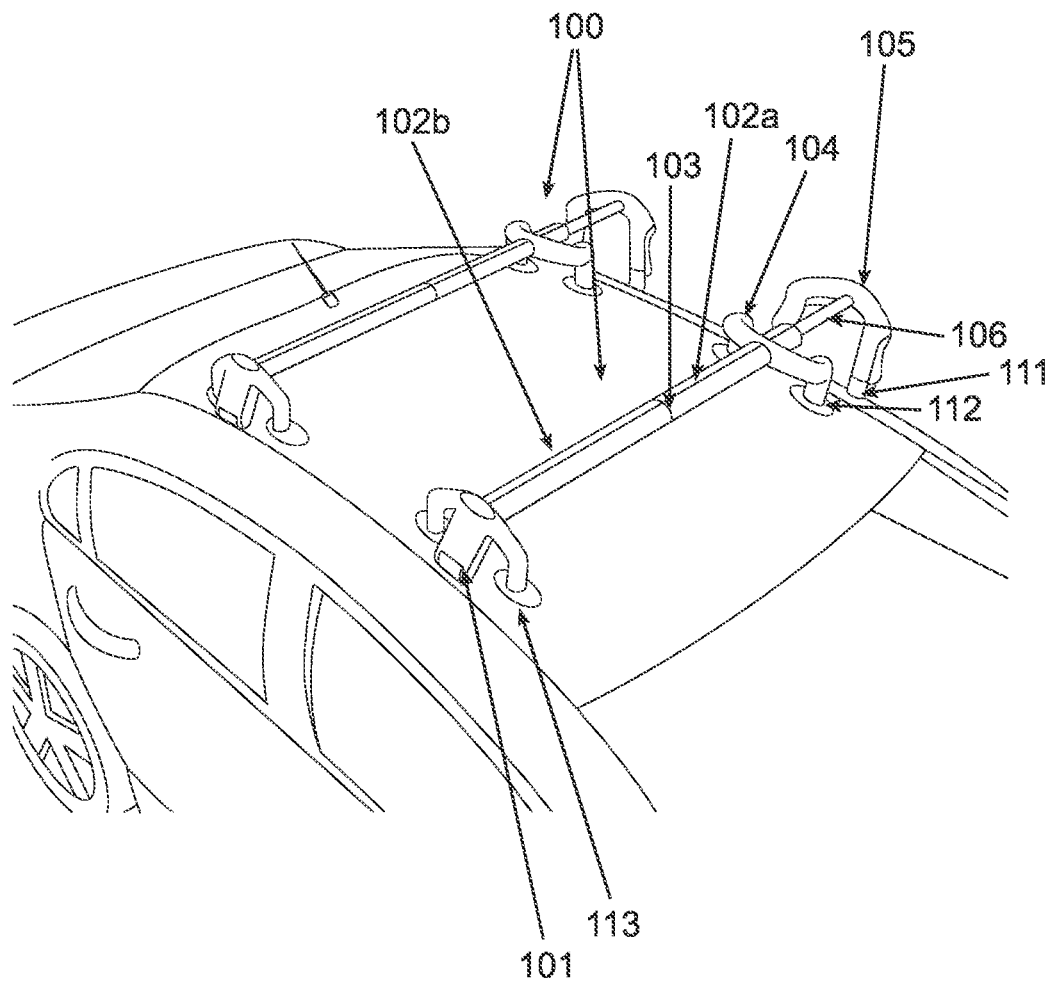
FIG. 17A is an illustrations of roof rack including two units mounted on a car as viewed from above, in accordance with embodiments of the present invention.
Figure 17B:
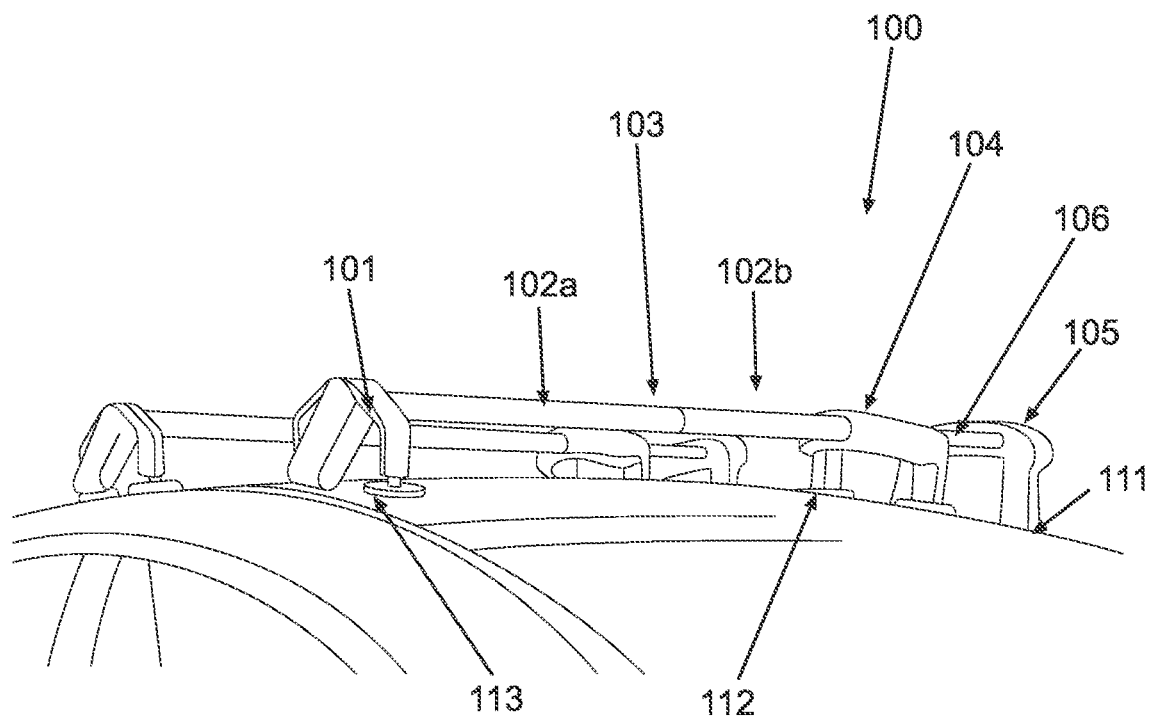
FIG. 17B is an illustrations of roof rack including two units mounted on a car as viewed from behind and a distal end, in accordance with embodiments of the present invention.
Figure 17C:
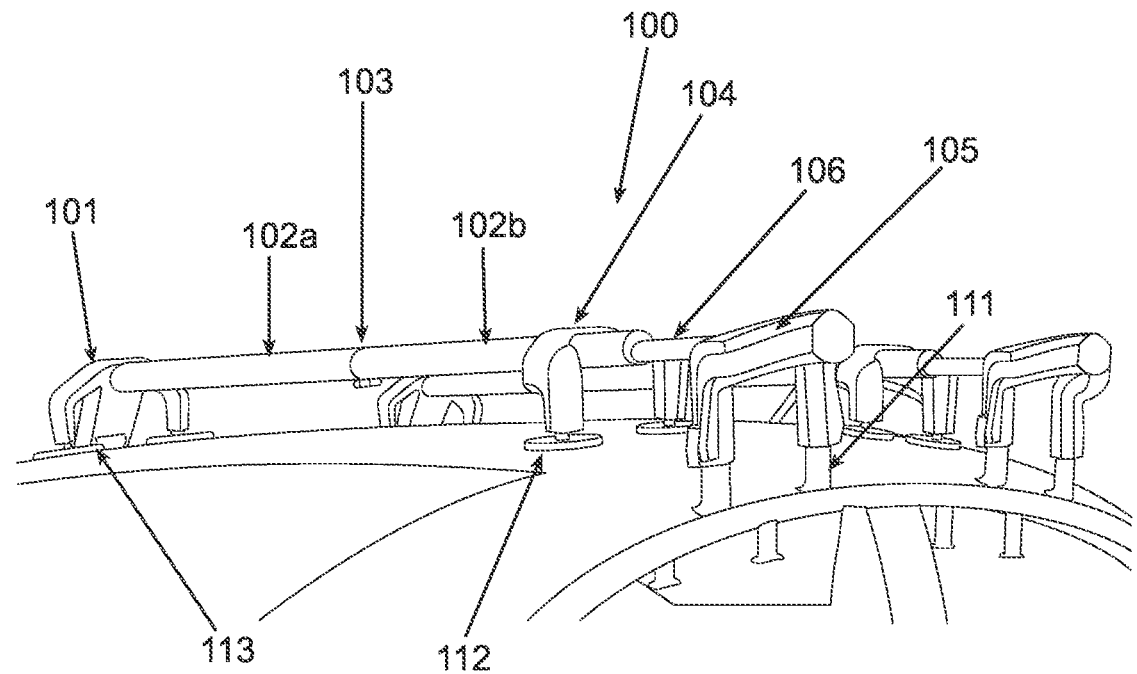
FIG. 17C is an illustrations of roof rack including two units mounted on a car as viewed from behind and a proximal end, in accordance with embodiments of the present invention.

FIG. 17A is an illustrations of roof rack including two units mounted on a car as viewed from above, in accordance with embodiments of the present invention. FIG. 17B is an illustrations of roof rack including two units mounted on a car as viewed from behind and a distal end, in accordance with embodiments of the present invention. FIG. 17C is an illustrations of roof rack including two units mounted on a car as viewed from behind and a proximal end, in accordance with embodiments of the present invention. Parts are numbered in accordance to FIG. 1A-1F It is expected that during the life of a patent maturing from this application many relevant technologies will be developed and the scope of the terms is intended to include all such new technologies a priori.

In sum, although various example embodiments have been described in considerable detail, variations and modifications thereof and other embodiments are possible. Therefore, the spirit and scope of the appended claims is not limited to the description of the embodiments contained herein.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

As used herein the term "about" refers to ±5%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between/range/range between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

The invention claimed is:

1. A rack for mounting on a car roof comprising:
a rack body configured for holding a load;
a distal support located on a distal portion of said rack body configured to support said distal portion of said rack body above a roof of a car; and
an anchor rigidly attached to a proximal portion of said rack body, said anchor projecting downward from said rack body and thin enough to fit between a closed door and door frame of a car;
wherein the rack folds to less than half its extended length.

2. The rack of claim 1, including a single hinge to perform folding of the rack.

3. The rack of claim 1, wherein the rack has a distance between said distal support and anchor of greater than 121 mm and folds to a length of less than 60 mm.

4. The rack of claim 1, including a first anchor support supporting said anchor extending laterally from a first side of said rack body and a second anchor support supporting a second anchor extending laterally on an opposite side and below the rack body.

5. The rack of claim 1, further including an adjustable length arm connecting said anchor to said distal support.

6. The roof rack of claim 5, wherein said adjustable length arm includes a ratchet mechanism allowing said anchor to be freely inserted towards the distal support and said ratchet mechanism inhibits extending away from the distal support unless a ratchet release mechanism is actuated.

7. The roof rack of claim 6, wherein said rack body includes an internal channel and said ratchet mechanism is located inside said internal channel.

8. The rack of claim 1, comprising an adjustable length extension extending in a downward direction between said anchor and said rack body.

9. The rack of claim 1, further comprising a proximal support.

10. The rack of claim 1 wherein said anchor includes a malleable portion insertable between said door frame and said closed door said malleable portion configured to deform to conform to a shape of an interface between said car door and said car door frame by forces exerted by said car door and said car door frame.

11. The roof rack of claim 1, wherein said distal support includes a distal cross-piece extending laterally of opposite sides of the rack body.

12. The roof rack of claim 1, wherein said distal support includes a magnetic pad configured to rest on a roof of a car.

13. The roof rack of claim 1, further comprising wherein said rack body includes an exposed channel configured for mounting an accessory mount.

14. The rack of claim 1, further comprising a lever extending below said rack body and distal to said distal support, said lever shaped and sized such that when said distal support is placed on a horizontal surface and said rack body is horizontal, said lever is held above said surface and when said distal support is placed on said horizontal surface and a proximal end of said rack body is slanted upwards, said lever contacts said surface.

15. The rack of claim 14, further comprising a roller, said roller, said roller mounted on a transverse axle on a distal portion of said lever, the roller configured to roll in a longitudinal direction with respect to the rack body along the surface.

16. A rack for mounting on a car roof comprising:
a rack body configured for holding a load;
a distal support located on a distal portion of said rack body configured to support said distal portion of said rack body above a roof of a car;
an anchor rigidly attached to a proximal portion of said rack body, said anchor projecting downward from said rack body and thin enough to fit between a closed door and door frame of a car; and
a lever extending below said rack body and distal to said distal support, said lever shaped and sized such that when said distal support is placed on a horizontal surface and said rack body is horizontal, said lever is held above said surface and when said distal support is placed on said horizontal surface and a proximal end of said rack body is slanted upwards, said lever contacts said surface.

17. The rack of claim 16, further comprising a roller, said roller, said roller mounted on a transverse axle on a distal portion of said lever, the roller configured to roll in a longitudinal direction with respect to the rack body along the surface.

18. The rack of claim 16, comprising an adjustable length extension extending in a downward direction between said anchor and said rack body.

19. A method of attaching a roof rack to a car comprising:
locating a distal support of the roof rack on a car roof;
locating a proximal anchor of the rack between a frame the car and an open door of the car;
adjusting a height of said anchors relative to said roof rack; and
closing said door onto said anchor to immobilize the anchor with respect to the car.

20. The method of claim 19, further comprising reducing a length between said rack anchors and said distal support, and fixing the reduced length by a rachet mechanism.

* * * * *